No. 814,392.

PATENTED MAR. 6, 1906.

J. C. PERRY.
MACHINE FOR MAKING WIRE GOODS.
APPLICATION FILED MAY 15, 1903.

19 SHEETS—SHEET 4.

Fig. 4.

Witnesses:

Inventor:
John C. Perry

No. 814,392.  
PATENTED MAR. 6, 1906.  
J. C. PERRY.  
MACHINE FOR MAKING WIRE GOODS.  
APPLICATION FILED MAY 15, 1903.  
19 SHEETS—SHEET 5.
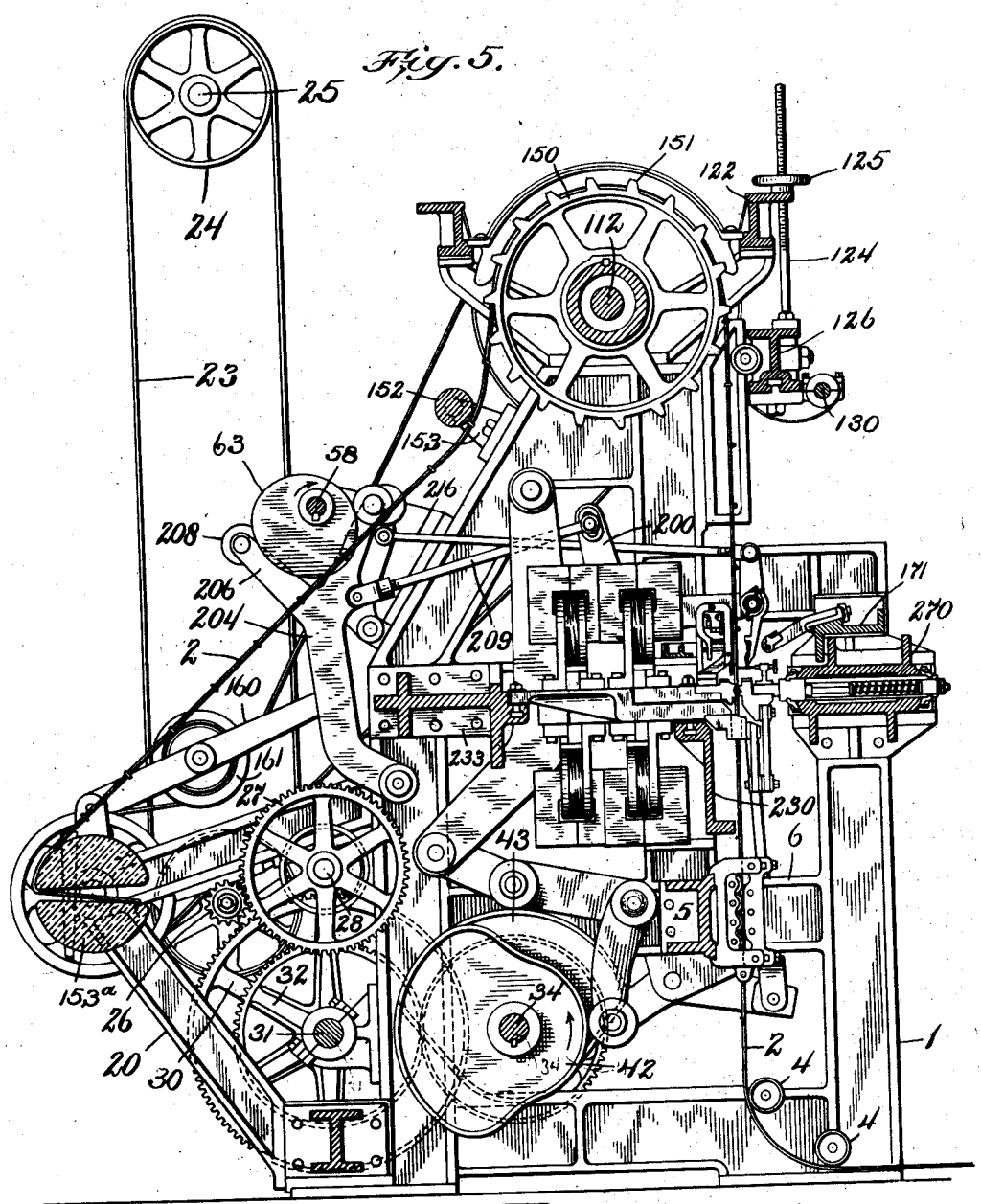
Fig. 5.
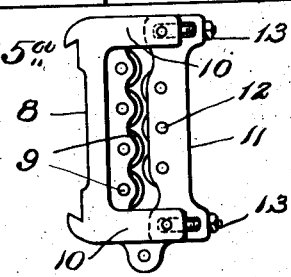
Fig. 5ª.
Witnesses:  
Inventor:  
John C. Perry

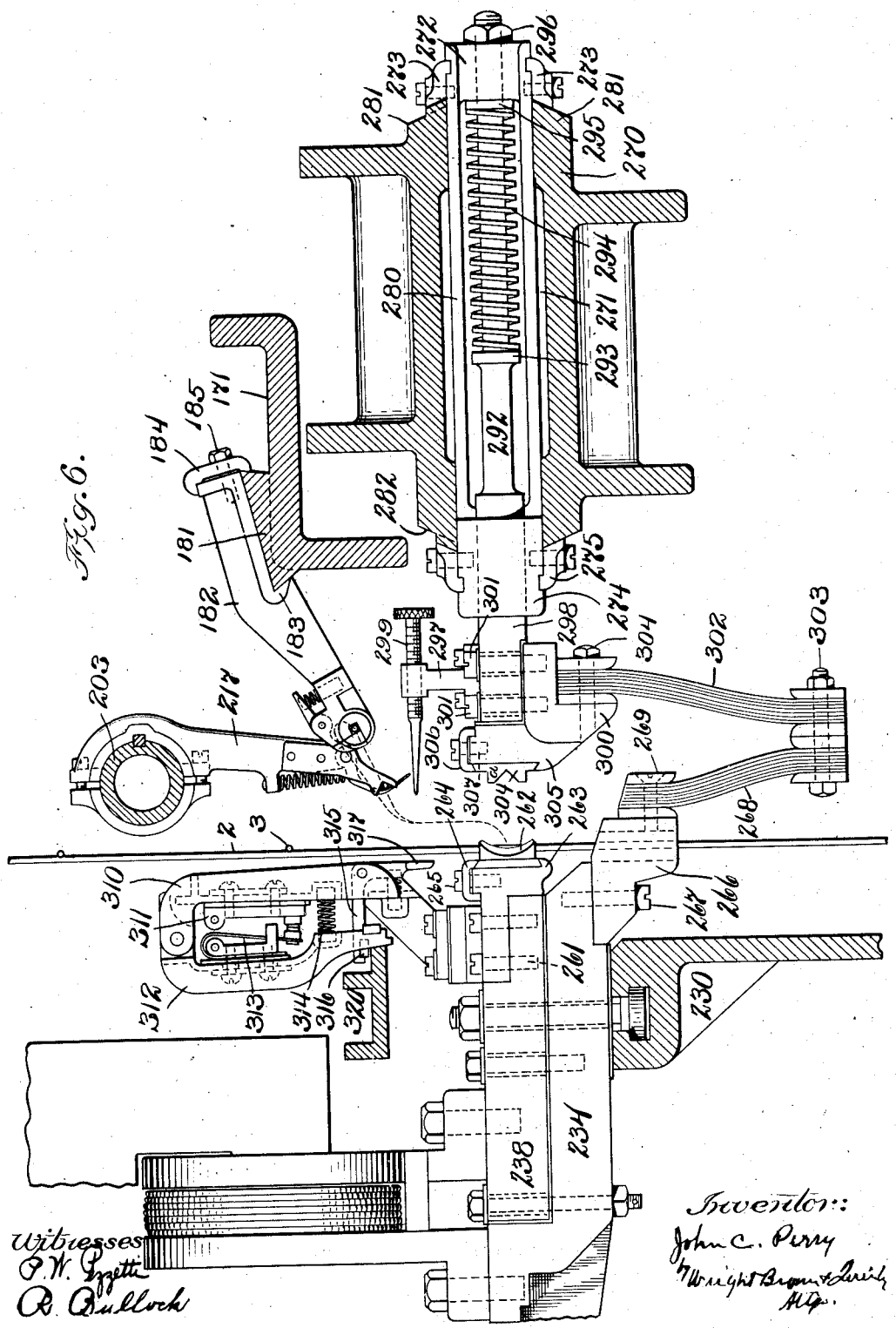

No. 814,392. PATENTED MAR. 6, 1906.
J. C. PERRY.
MACHINE FOR MAKING WIRE GOODS.
APPLICATION FILED MAY 15, 1903.
19 SHEETS—SHEET 7.
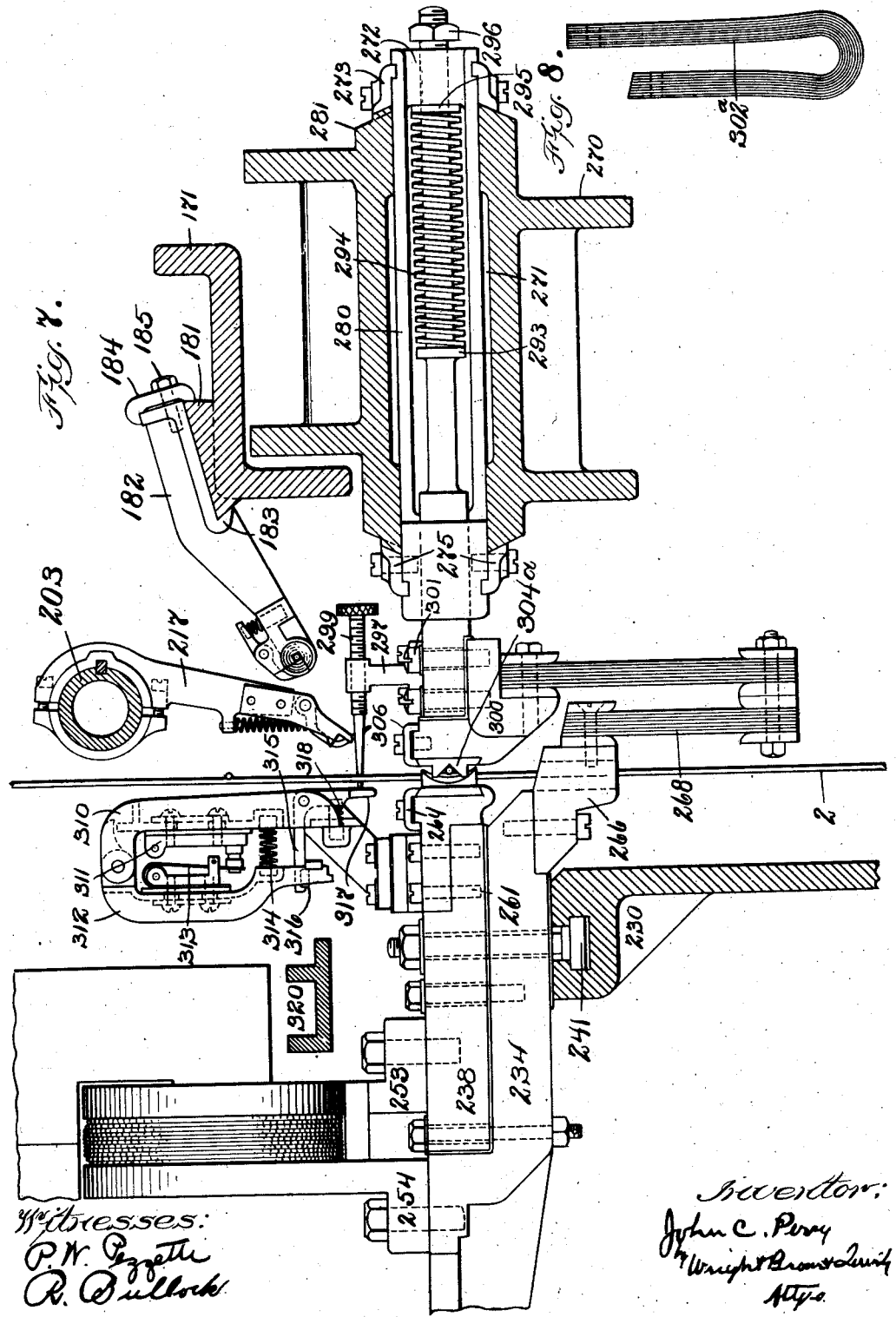

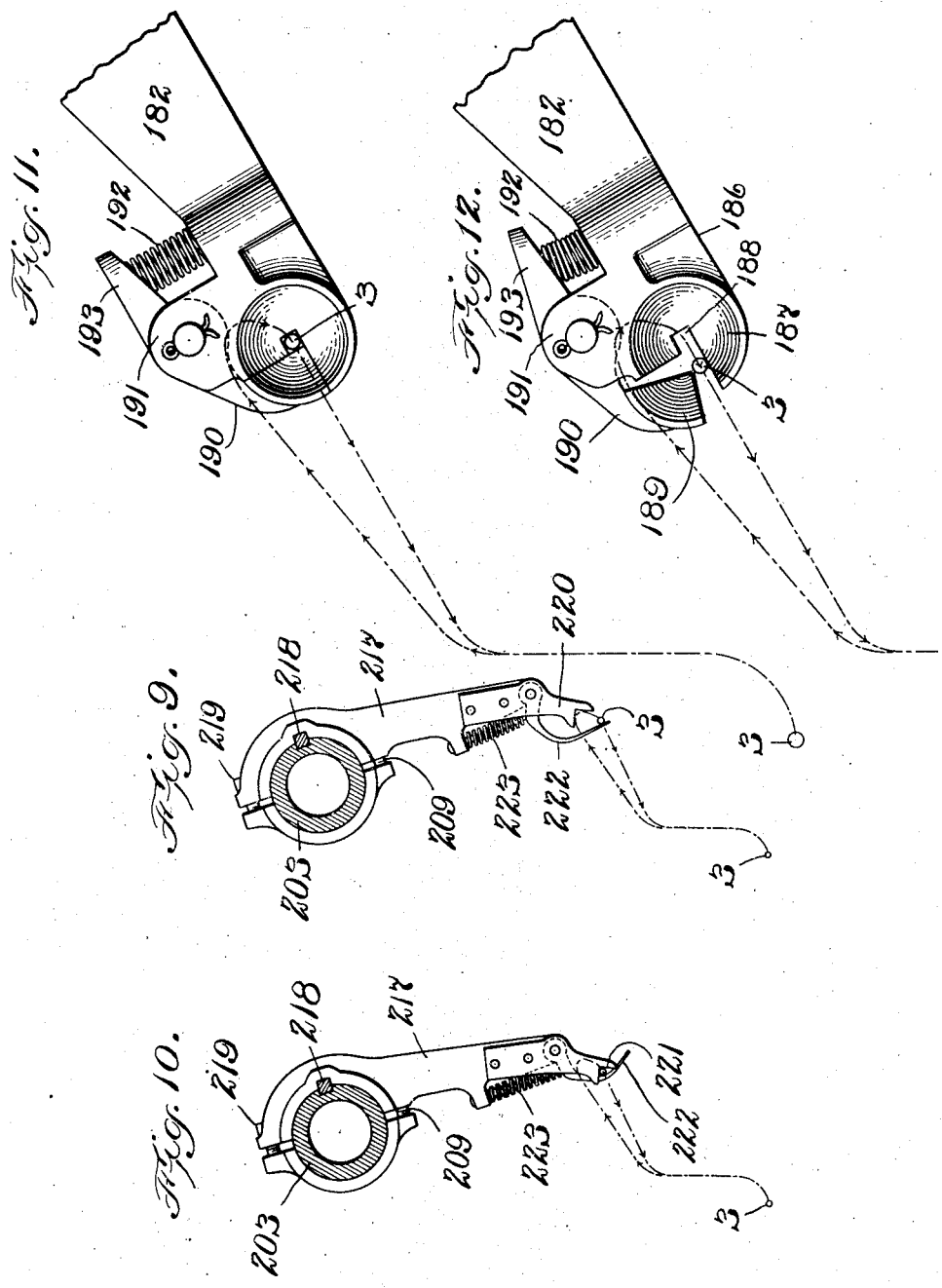

No. 814,392. PATENTED MAR. 6, 1906.
J. C. PERRY.
MACHINE FOR MAKING WIRE GOODS.
APPLICATION FILED MAY 15, 1903.
19 SHEETS—SHEET 9.

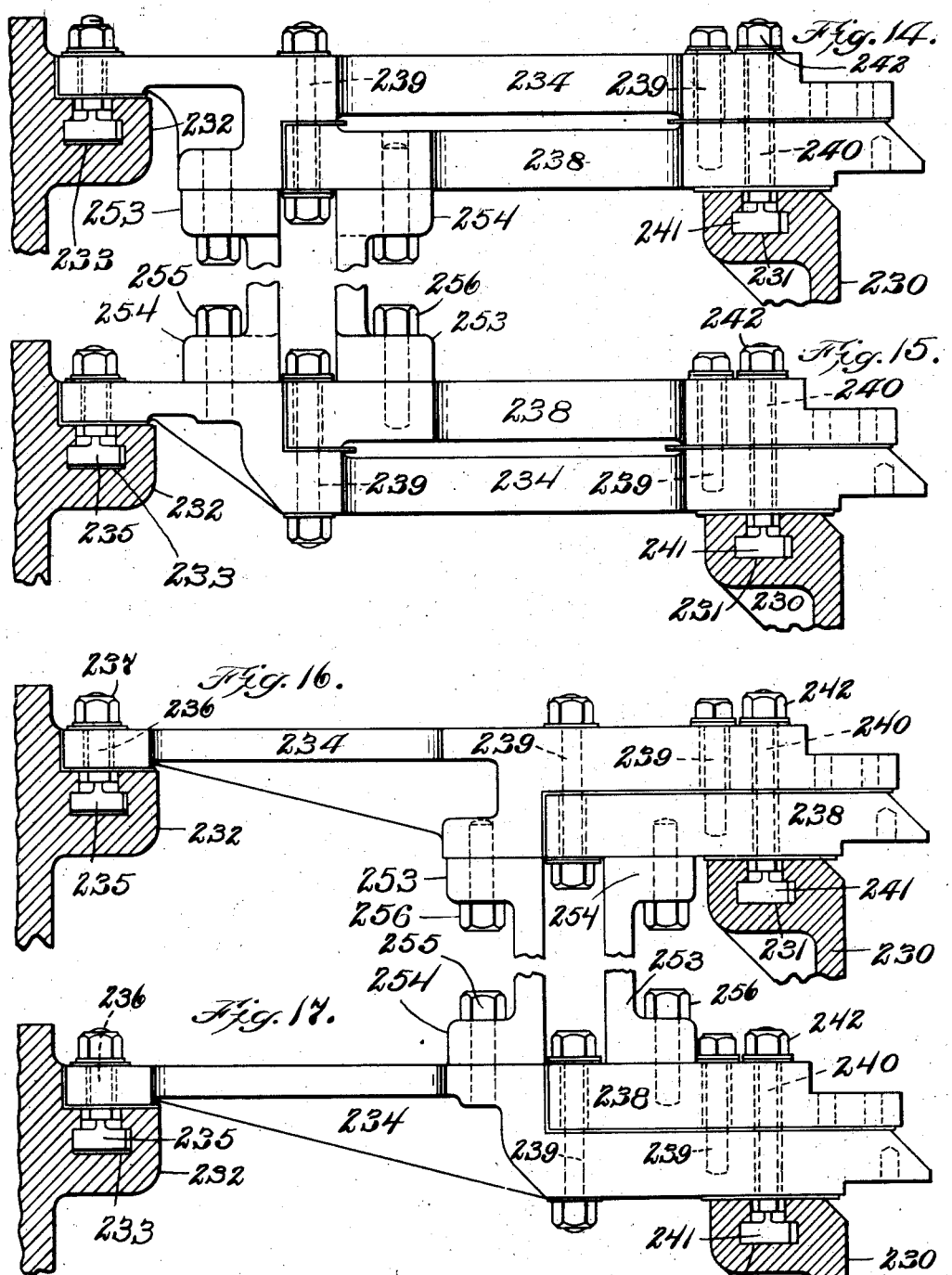

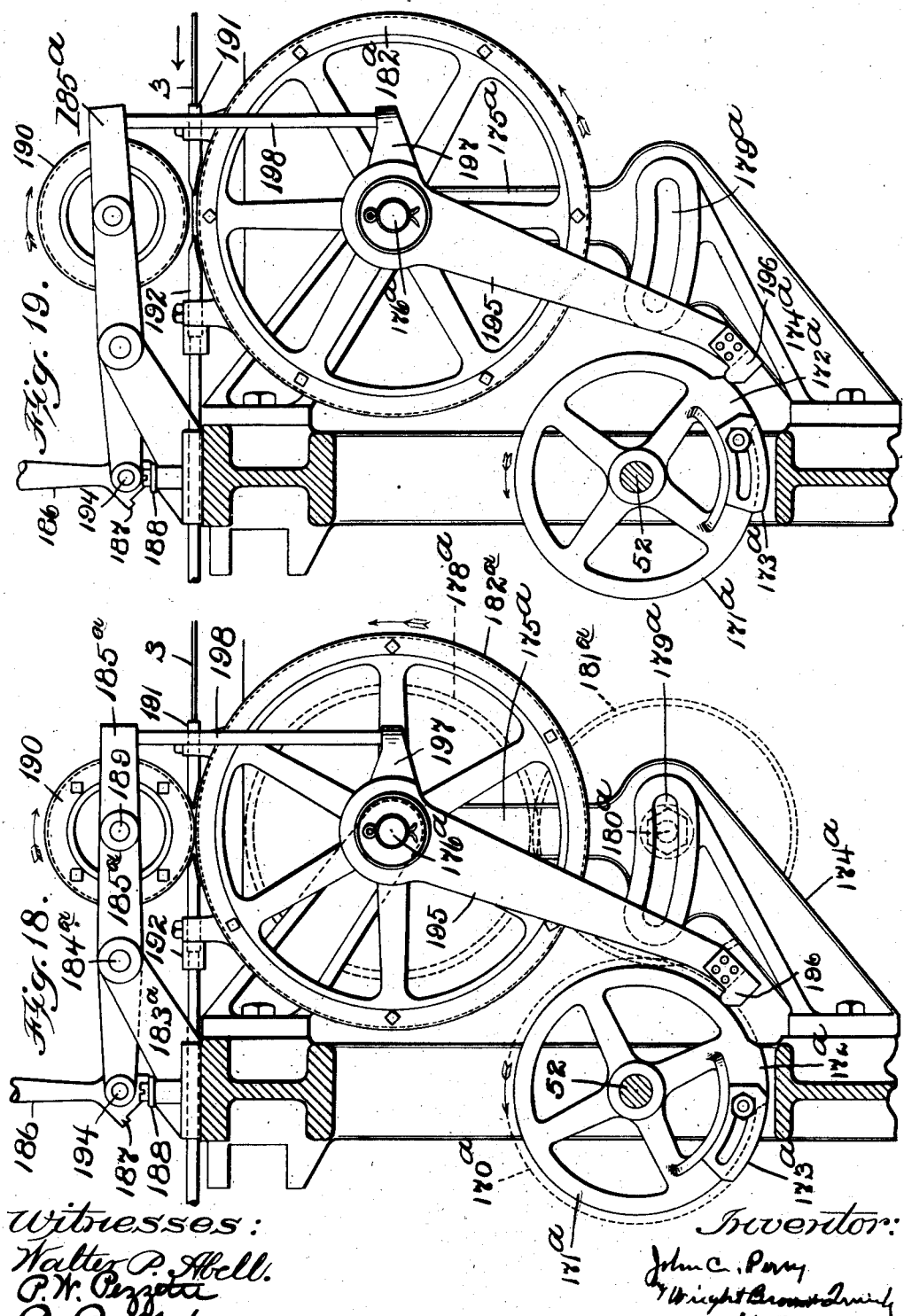

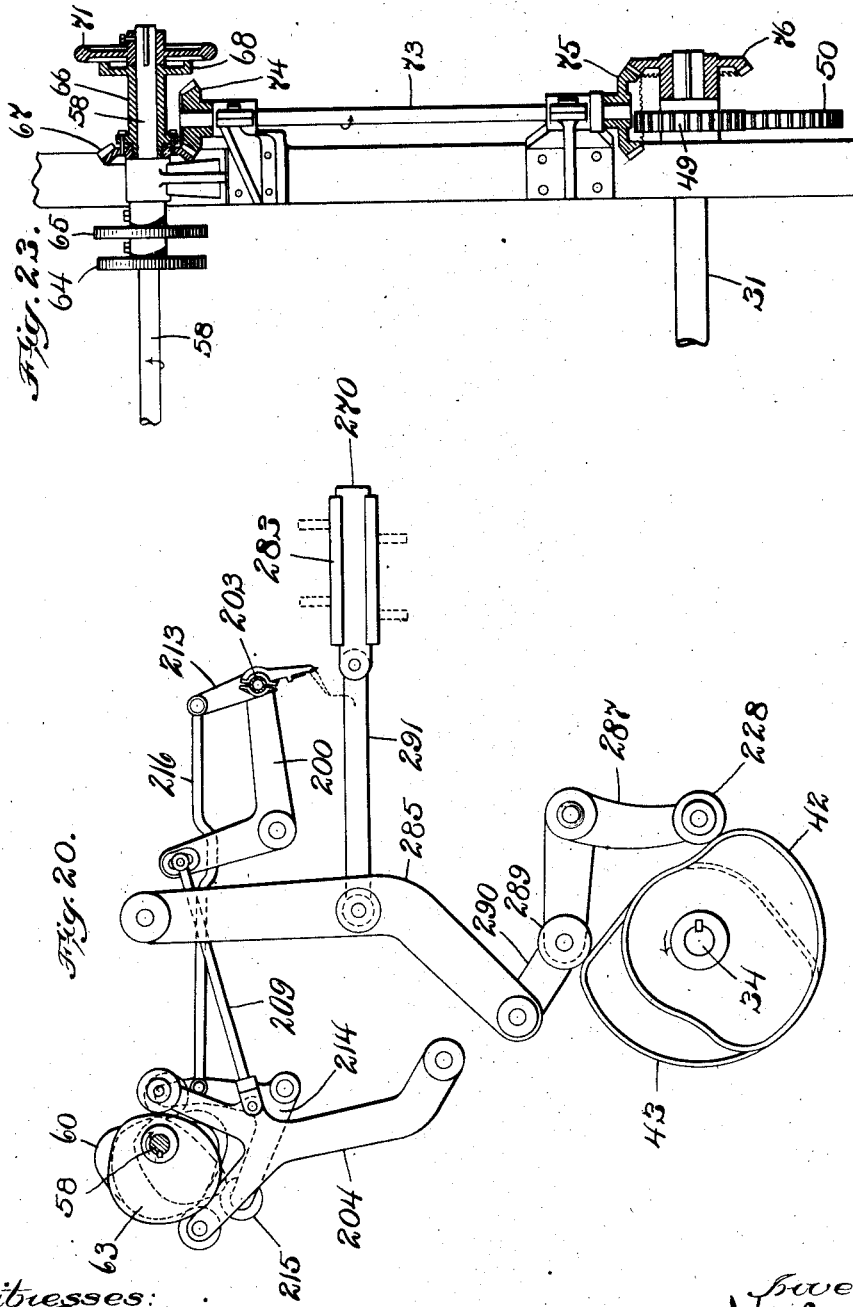

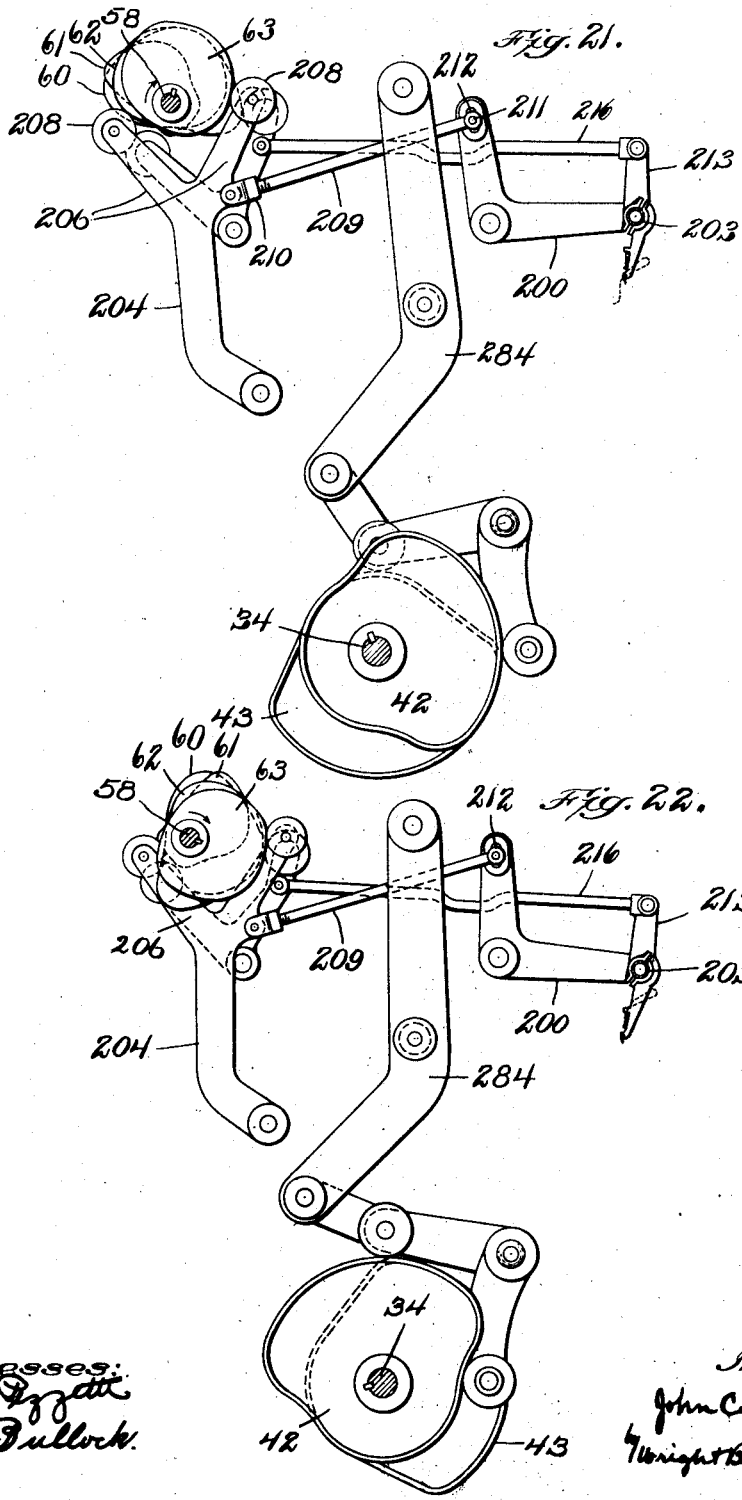

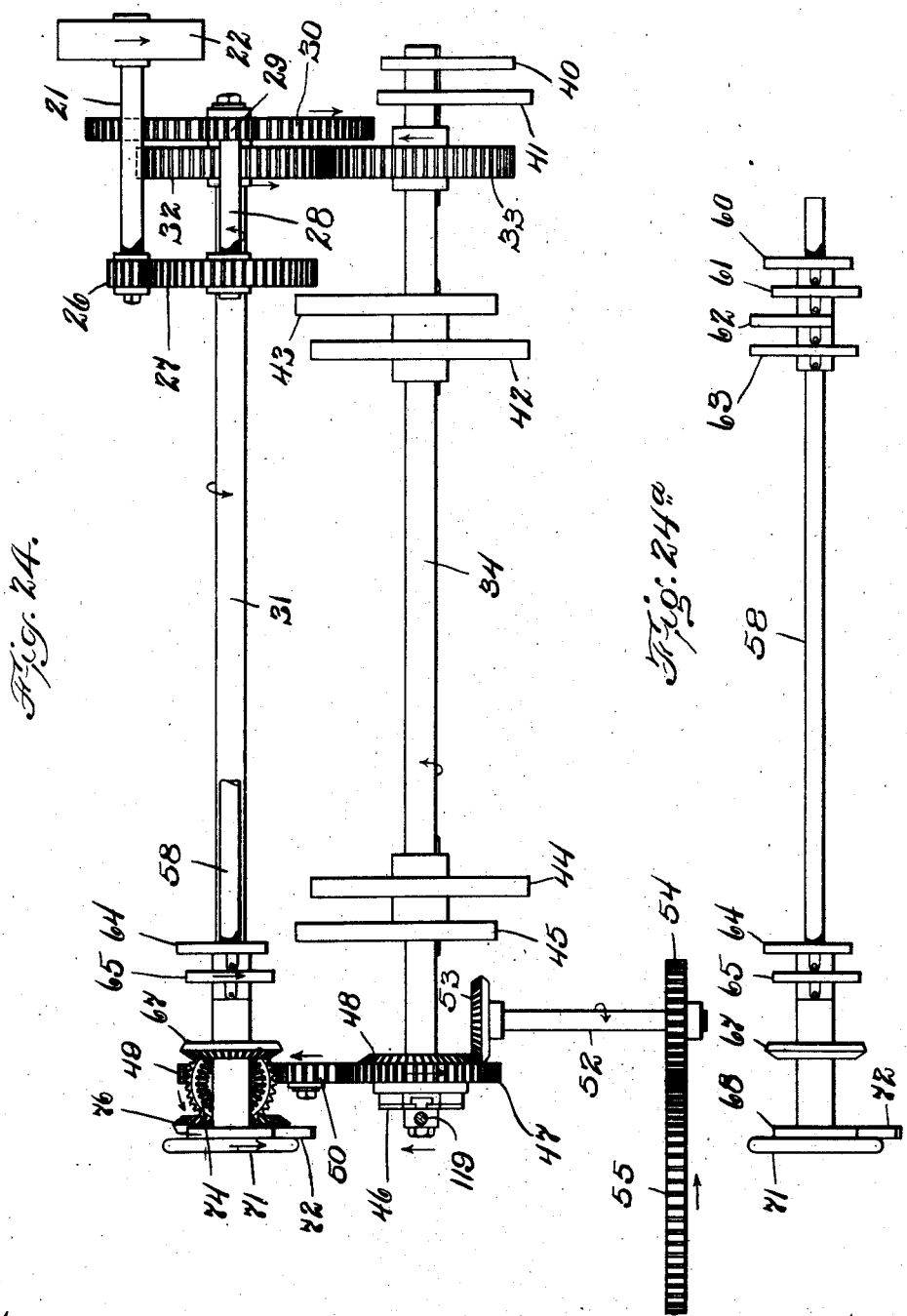

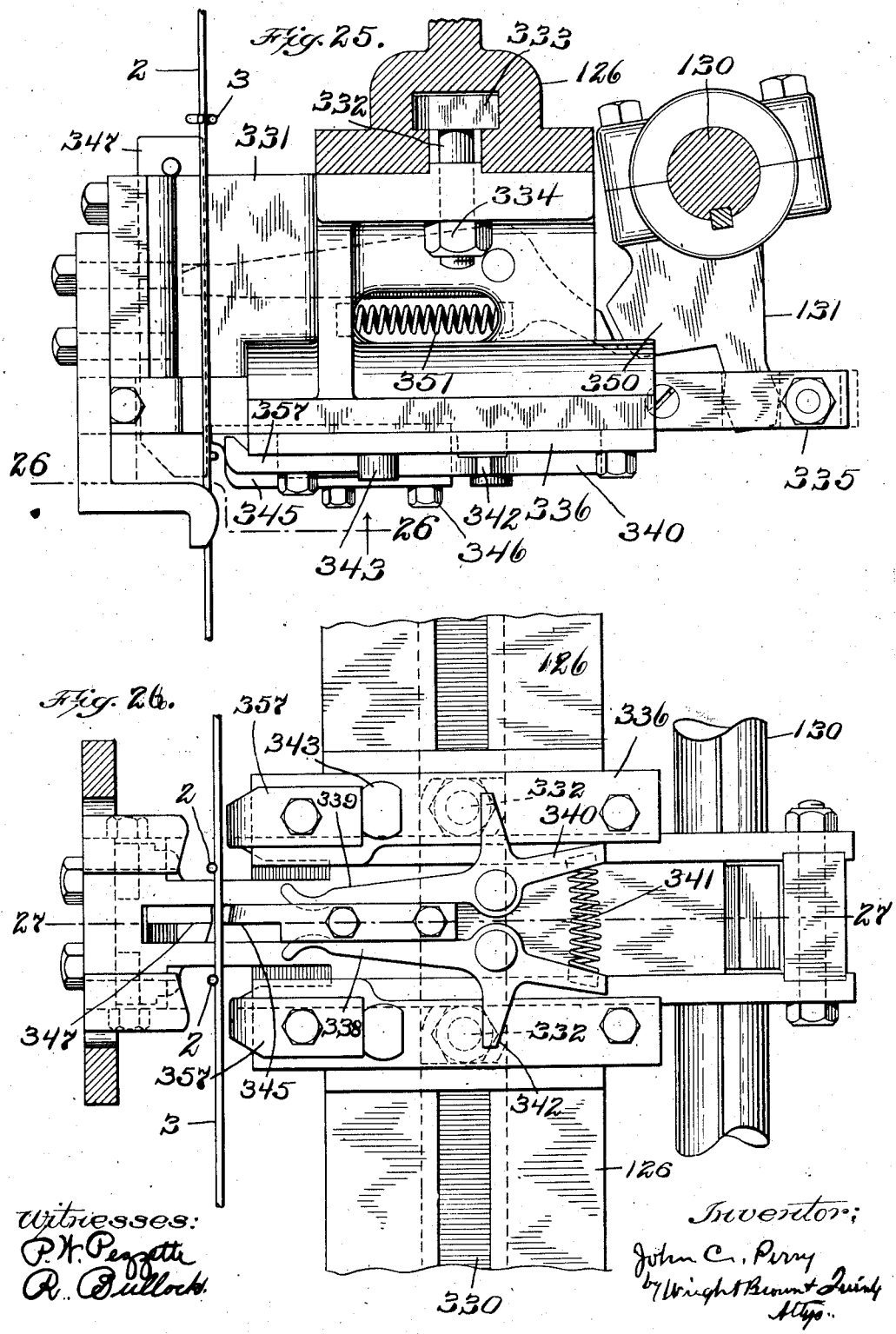

No. 814,392. PATENTED MAR. 6, 1906.
J. C. PERRY.
MACHINE FOR MAKING WIRE GOODS.
APPLICATION FILED MAY 15, 1903.
19 SHEETS—SHEET 16.
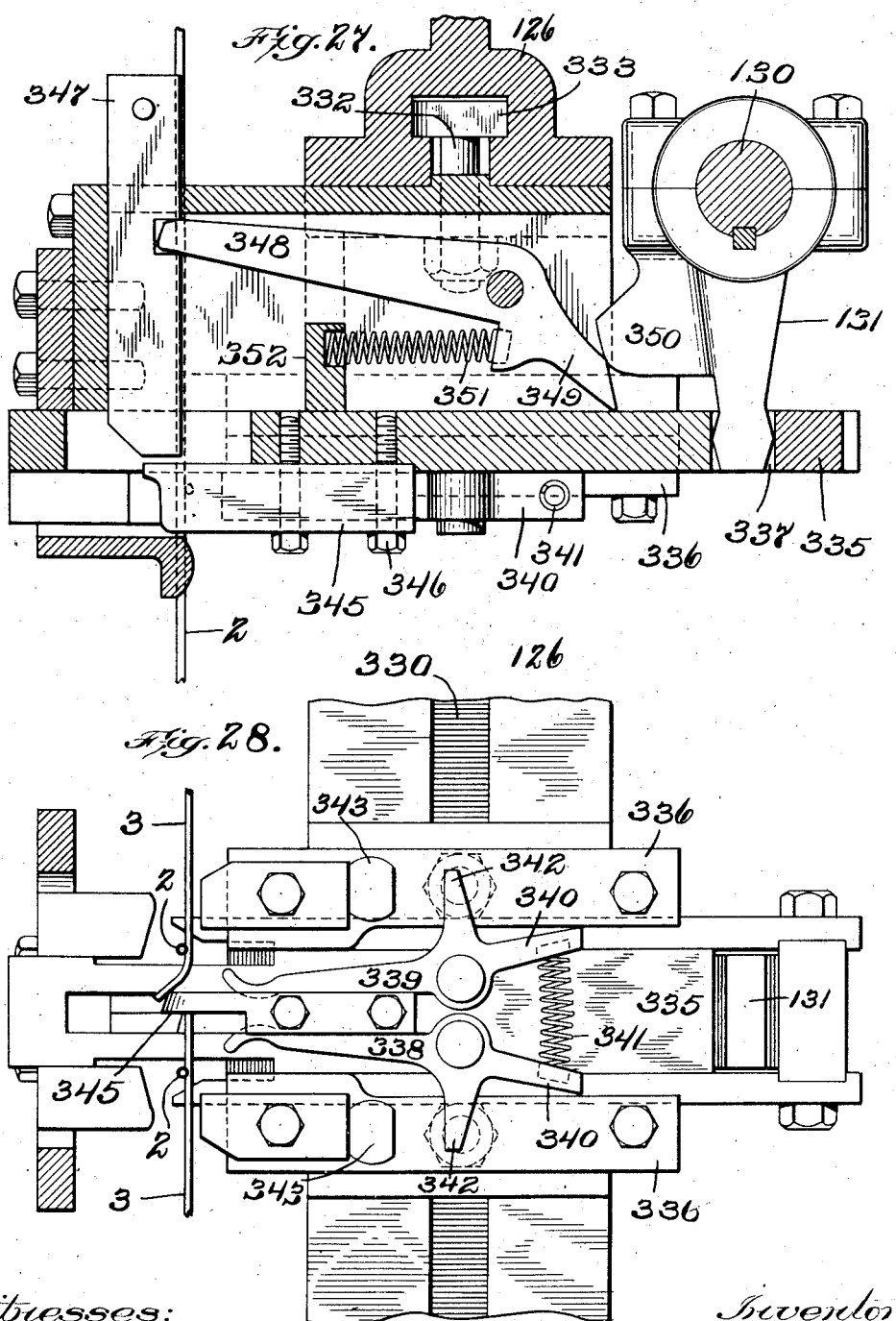

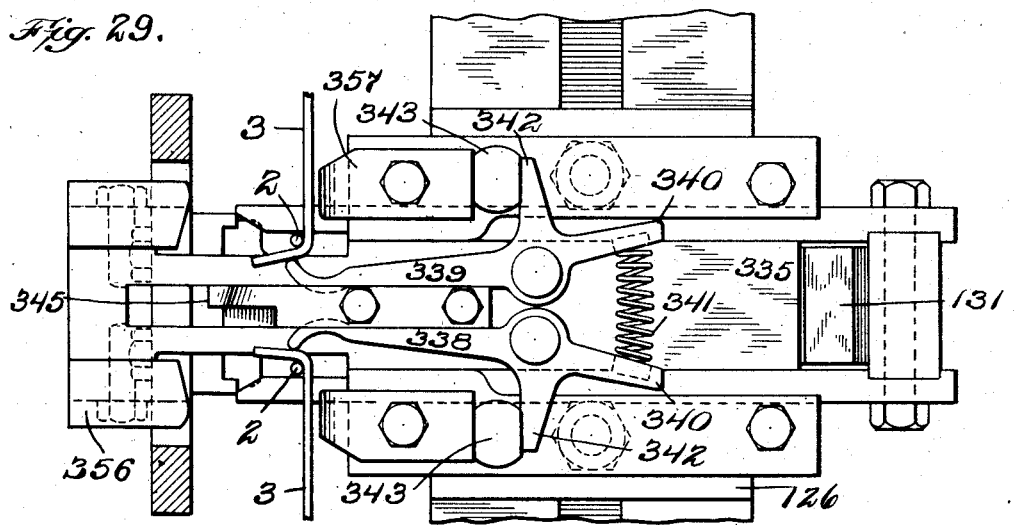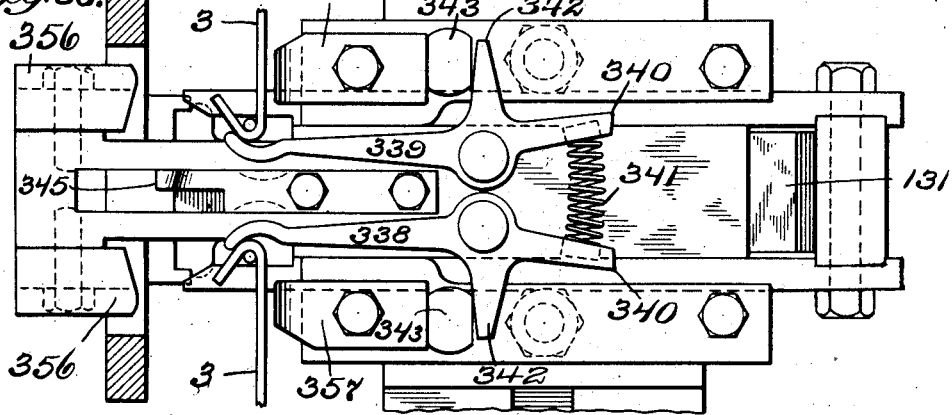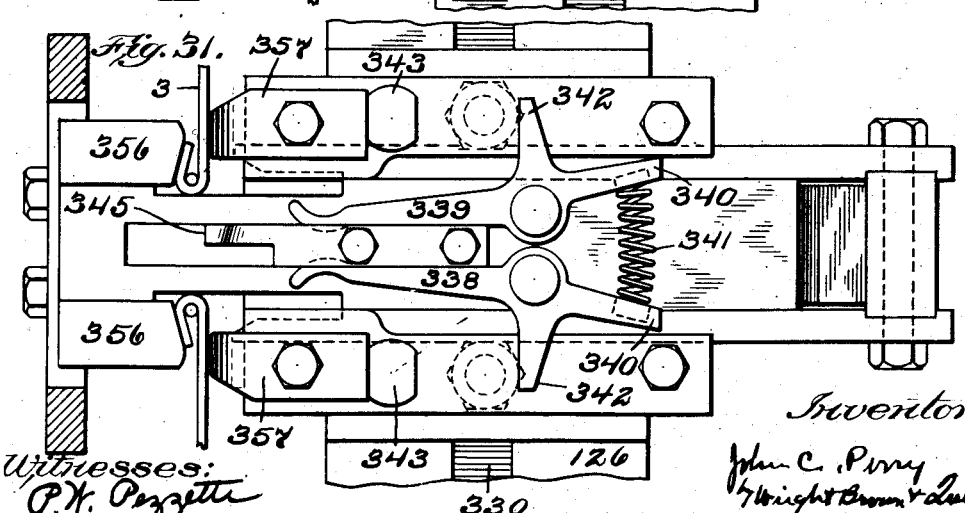

No. 814,392. PATENTED MAR. 6, 1906.
J. C. PERRY.
MACHINE FOR MAKING WIRE GOODS.
APPLICATION FILED MAY 15, 1903.
19 SHEETS—SHEET 18.
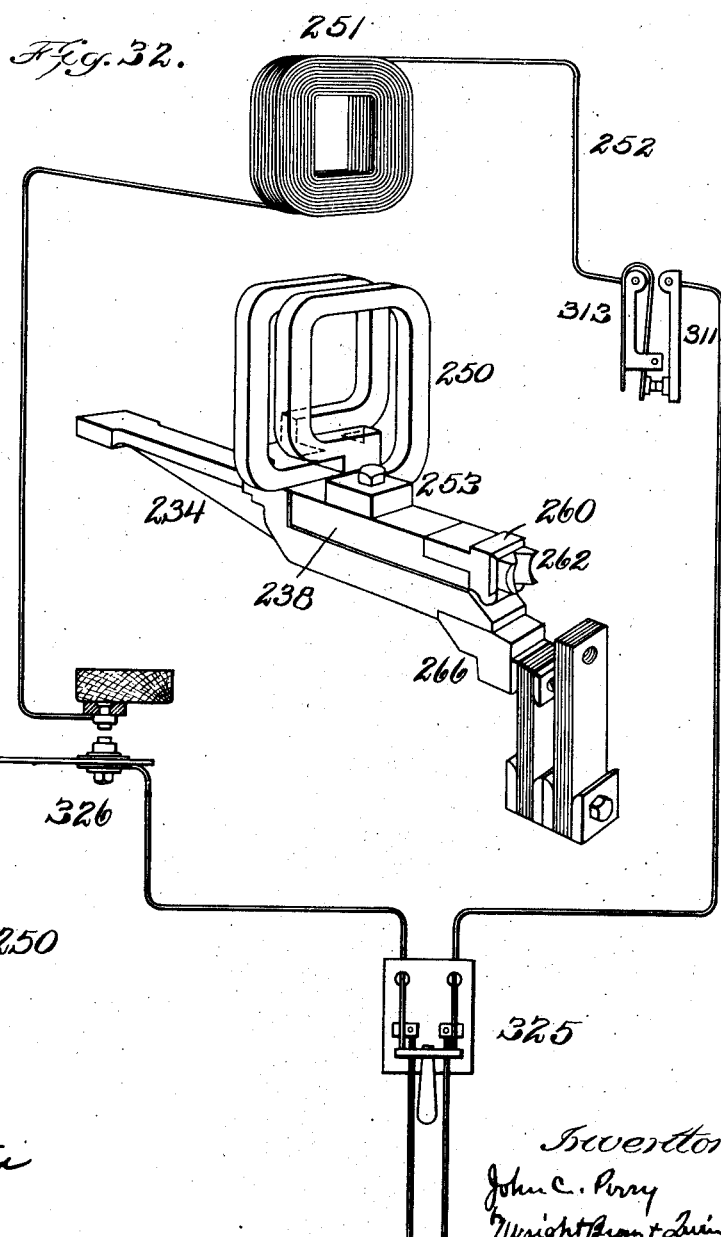

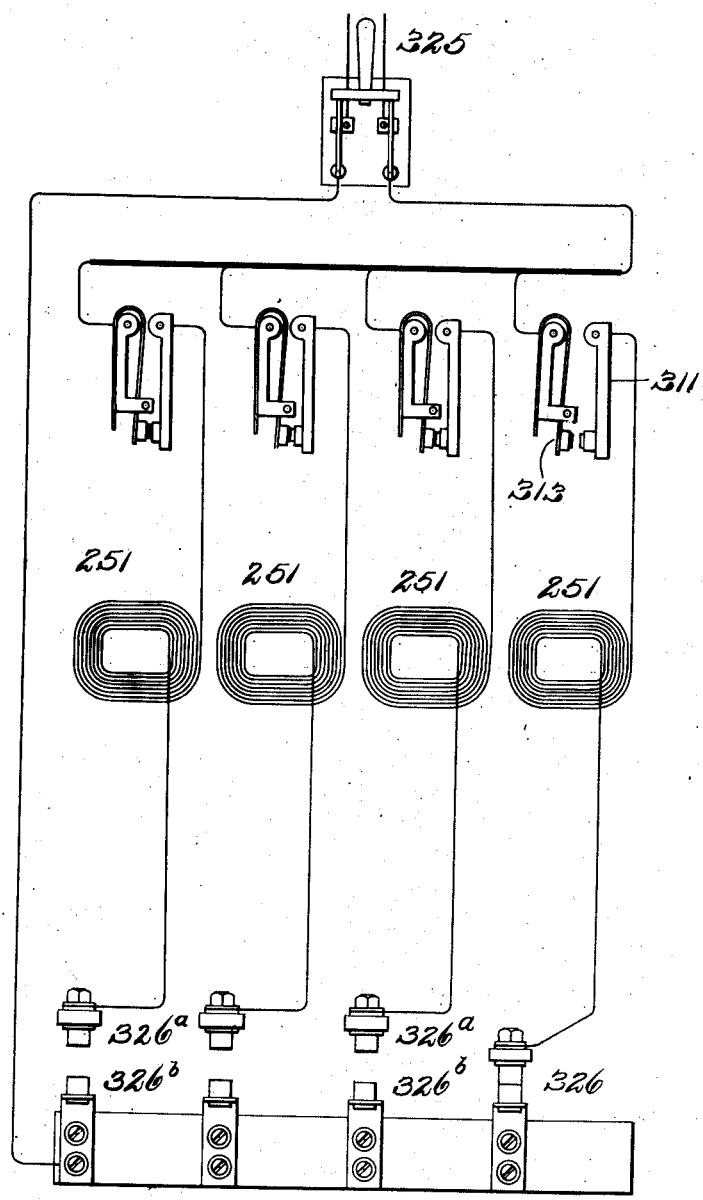

UNITED STATES PATENT OFFICE.

JOHN C. PERRY, OF CLINTON, MASSACHUSETTS, ASSIGNOR TO CLINTON WIRE CLOTH COMPANY, OF CLINTON, MASSACHUSETTS.

MACHINE FOR MAKING WIRE GOODS.

No. 814,392.      Specification of Letters Patent.      Patented March 6, 1906.

Application filed May 15, 1903. Serial No. 157,258.

*To all whom it may concern:*

Be it known that I, JOHN C. PERRY, of Clinton, in the county of Worcester and State of Massachusetts, have invented certain new and useful Improvements in Universal Machines for Making Wire Goods, of which the following is a specification.

This invention relates to a machine for making wire goods, such as fences, mats, lathing, barb-wire, &c.

Figure 1:
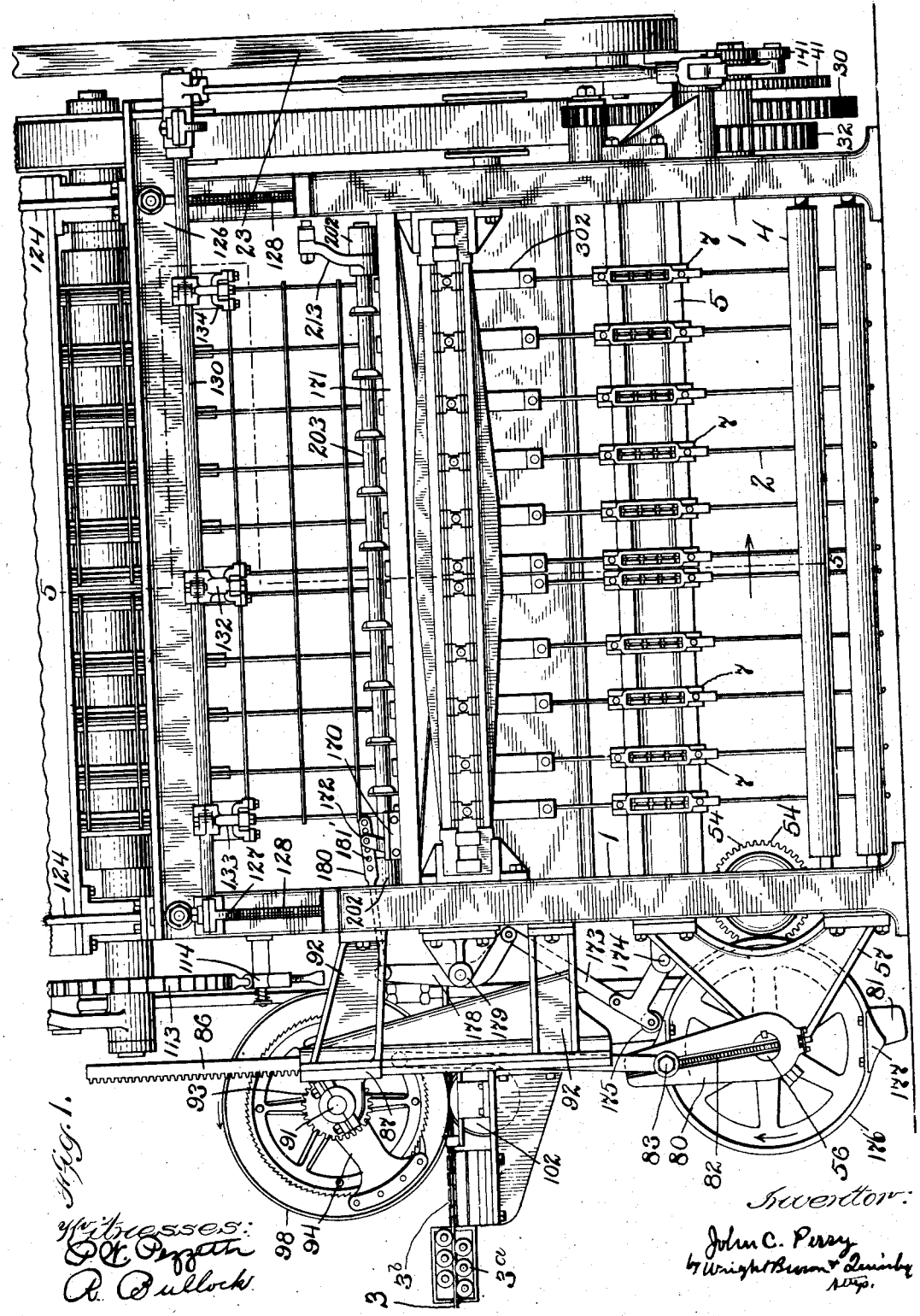
Figure 2:
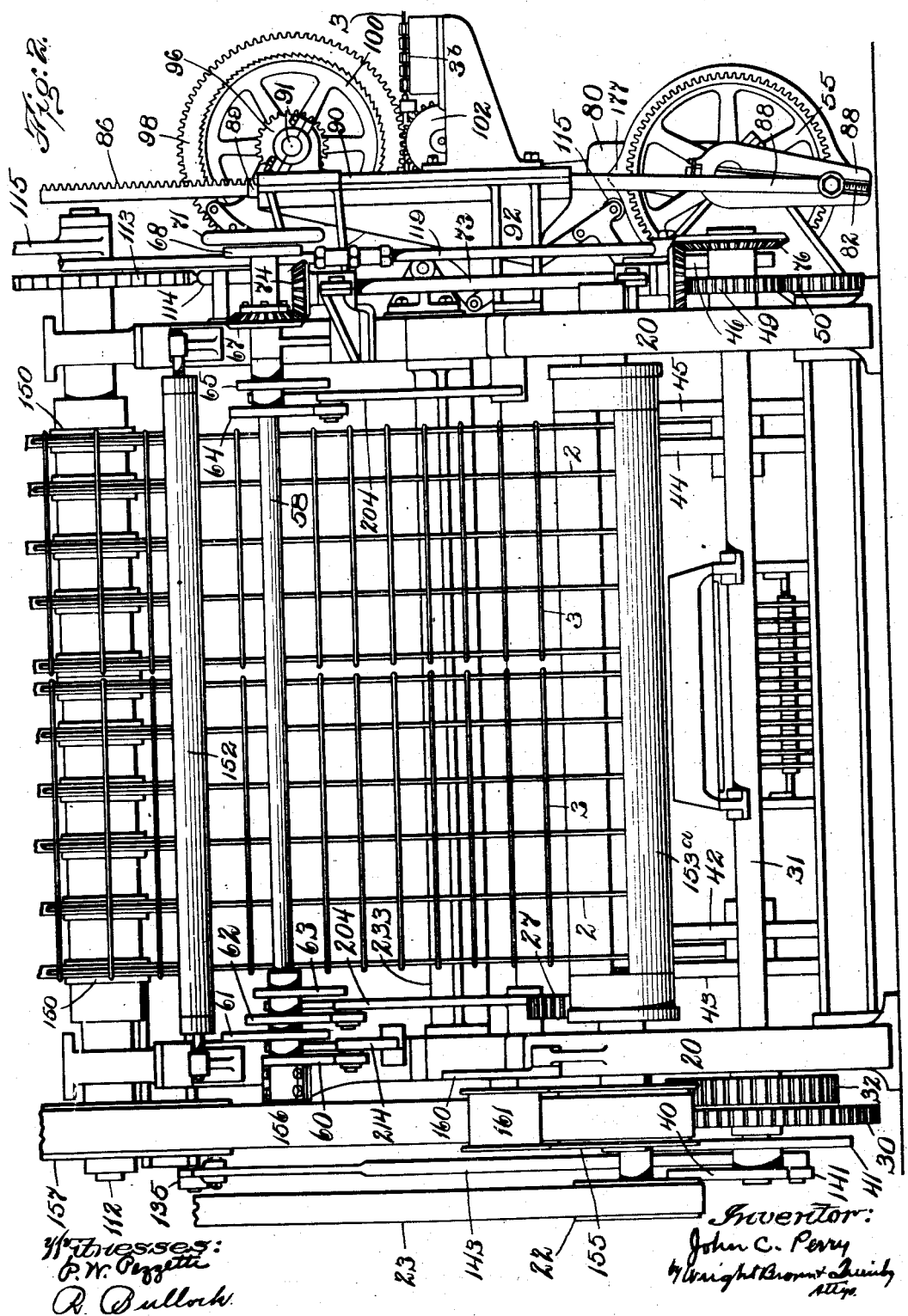
Figure 3:
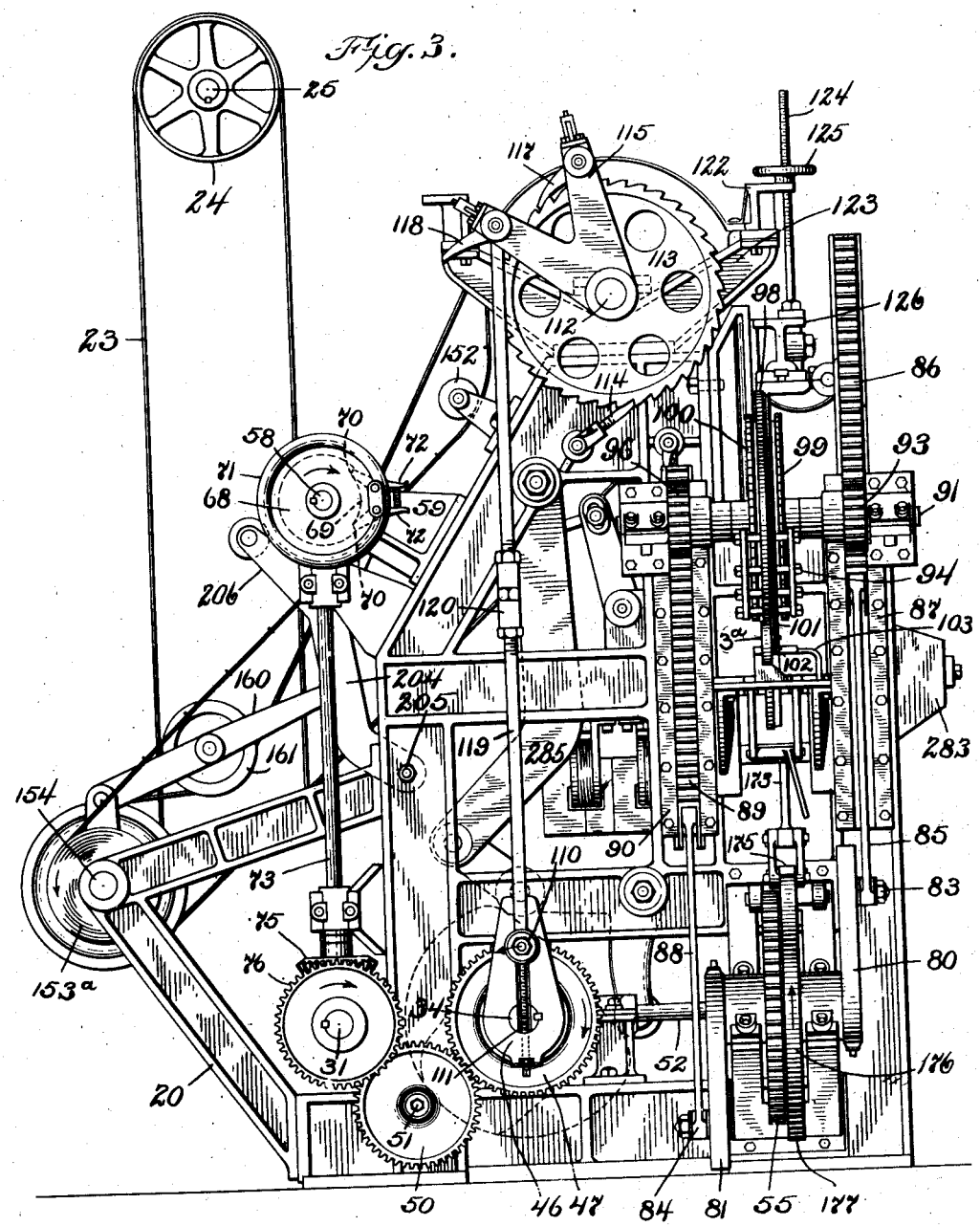
Figure 13:
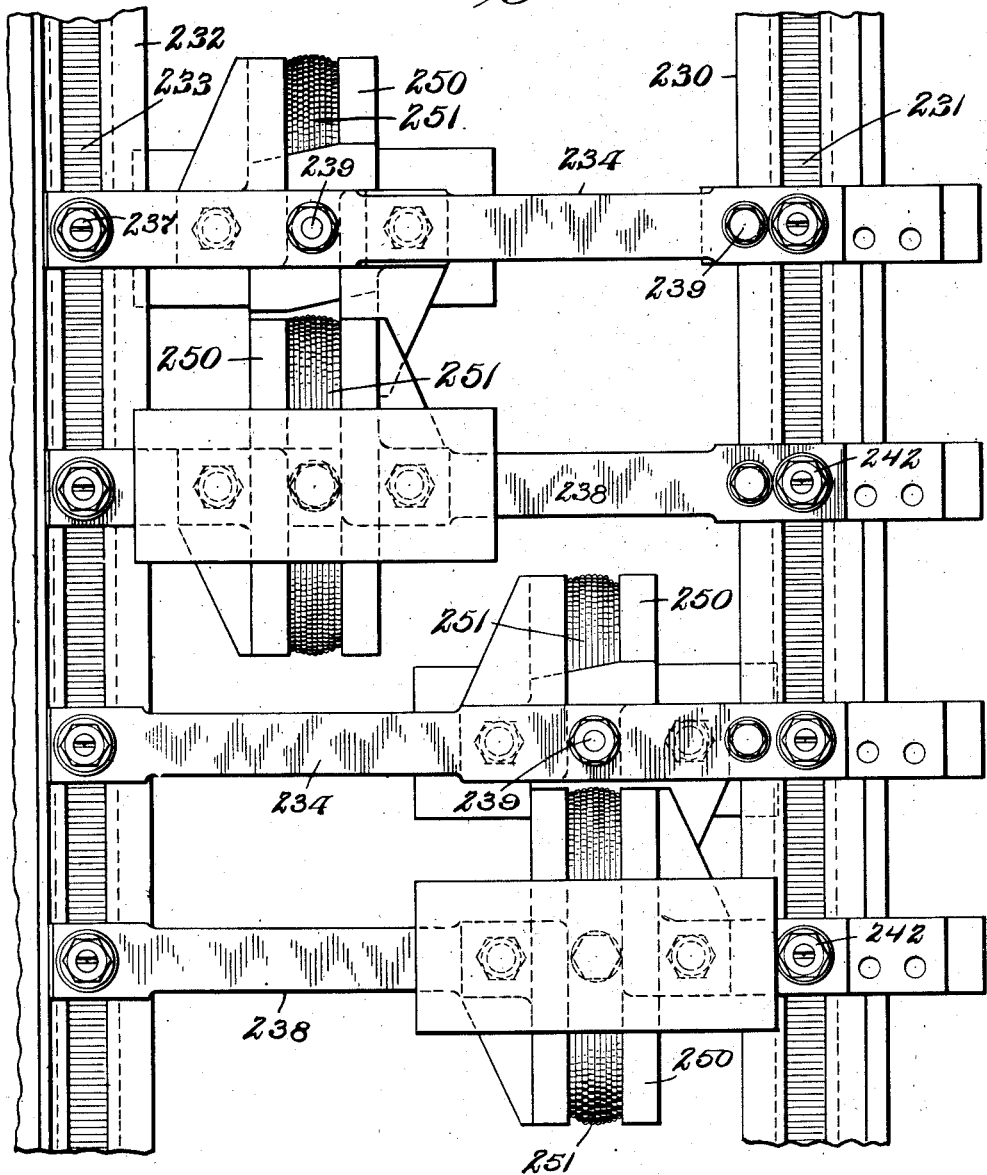

Figure 1 in front elevation shows a machine constructed in accordance with my invention. Fig. 2 is a rear elevation of said machine. Fig. 3 is a left-hand end view of the machine. Fig. 4 is a right-hand end view of the machine. Fig. 5 is a vertical cross-sectional view of the machine on the line 5 5 of Fig. 1 looking in the direction of the arrow or toward the right-hand end of the machine. Fig. 5$^a$ is a detail view of the strand-wire-straightening rolls and the parts by which they are carried. Fig. 6 is a view similar to Fig. 5 of the welding-jaws, receivers, and transferrers and their associated parts, this view being on a larger scale than that employed in Fig. 5. In this view the welding-jaws are shown as open and the transfer-fingers as between the receivers and the welding-jaws. Fig. 7 is a view similar to Fig. 6, showing the welding-jaws closed and the receiver-fingers back of the plane of the welding action. Fig. 8 is a detail view of a laminated copper connection between the movable welding-jaw and its copper terminal. Fig. 9 is a detail view of one of the transfer-fingers, the path of motion of the finger being indicated by the arrow-line and the finger being shown in its position of engagement with the stay-wire. Fig. 10 is a similar view to Fig. 9, showing the complete engagement of the stay-wire by the transfer-finger. Fig. 11 is a detail view of one of the stay-wire receivers, the path of motion of the transfer-finger with relation to said receiver being indicated by the arrow-line, the stay-wire being shown in position within the receiver. Fig. 12 is a view similar to Fig. 11, showing the parts as they appear when the transfer-finger is removing a stay-wire from the receiver. Fig. 13 is a detail top plan view of four transformers with their copper bar-terminals, showing the arrangement by which the said transformers are nested in close arrangement. Fig. 14 is an end elevation of the top transformer and its terminals shown in Fig. 13. Fig. 15 is a like view of the second transformer and its terminals shown in Fig. 13. Fig. 16 is a like view of the third transformer and its terminals shown in Fig. 13. Fig. 17 is a like view of the lower transformer and its terminals shown in Fig. 13. Figs. 14 to 17, taken in connection with Fig. 13, show the means by which the transformers are arranged in close or nested order. Fig. 18 is a detail view showing one form of mechanism for feeding the stay-wire, the parts being shown in the position they occupy while a stay-wire is being fed. Fig. 19 is a like view showing the parts in the position they occupy while the stay-wire is not being fed. Fig. 20 is a detail view showing the mechanism for operating the plunger-rails and the transfer-fingers, the transfer-finger being shown at its initial position. Fig. 21 is a like view of the position occupied by the parts when a transfer-finger has completed about one-fourth of its cycle of motion. Fig. 22 is a like view showing the position occupied by the parts when the transfer-finger has been given one-half of its cycle of motion, or, in other words, when the transfer-finger has placed the stay-wire against the strand-wires in a position to be grasped by the welding-jaws. Fig. 23 is a detail view of the mechanism by which the machine may be unlocked from the power-shaft and turned by hand. Fig. 24 is a plan view of the shafting and gears by which power is imparted to the several parts of the machine. Fig. 24$^a$ is a plan view of one of the shafts and the cams carried thereby. Fig. 25 in side elevation shows the combined cutter and coiler carried at the center of the adjustable girth at the top front side of the machine. Fig. 26 is a bottom plan view of the parts shown in Fig. 25, the cutter being shown in engagement with and about to sever one of the stay-wires, said view being taken on the line 26 26 of Fig. 25. Fig. 27 is a cross-sectional view taken on the line 27 27 of Fig. 26, showing the vertically-movable cutter-blade. Fig. 28 is a view similar to Fig. 26, showing the two cutter-blades in their shearing position, with the stay-wire severed. Fig. 29 is a view similar to Fig. 28, showing the coiling-fingers in their engagement with the cut ends of the stay-wire and having forced said cut ends outward from the plane they occupied when severed. Fig. 30 is a like view showing the coiling-fingers in the position occupied by them at their final stroke, by which they throw the cut end of the stay-wire about the strand-wire, and at an acute angle to the stay-wire, in position to be engaged by a hammer. Fig. 31 is a similar view showing the cut ends of the stay-wire as it is engaged by a hammer and bent back upon the stay-wire to their final position. Fig. 32 is a detail view showing in perspective a copper bar-coil of a secondary or welding circuit, its bar-terminals, and also a primary coil and its parts, said primary coil being raised out of the secondary coil to show the arrangement of the parts. Fig. 33 is a detail perspective view of one-half of a secondary coil. Fig. 34 is a plan view of the primary circuits of the transformers and the means employed for making and breaking said circuits.

1 represents the framework of the machine, of suitable form and strength to support the several parts to be carried thereby.

2 represents a series of strand-wires, to be led in from the bottom of the machine about the guide-rolls 4 4, carried by the lower part of the framework.

5 represents a stationary girth, carried by horizontal cross-girths 6 6 at each end of the machine. The girth 5 is located above and just back of the rolls 4 4.

7 represents a series of strand-wire-straighteners adjustably mounted upon the front of the girth 5, there being one of these straighteners for each strand-wire. (See Fig. 1.) Each strand-wire straightener, Fig. 5ª, is composed of a bracket 8, adjustably mounted on the front girth and carrying a series of rolls 9. Each bracket is formed with two forwardly-projecting arms 10.

11 represents a bar slidingly mounted in the ends 10 of the bracket and carrying a series of rolls 12, that are opposed to but staggered with the rolls 9. Set-screws 13 13 are arranged to adjust the bar 11 and the rolls 12 toward or from the rolls 9, carried by the bracket. By adjusting the rolls as described the drag of the rolls upon the strand-wire may be increased or diminished, as desired, not only for the purpose of straightening the wire, but for giving it the proper tension in the machine. Referring to Fig. 1, 3 represents a stay or cross wire led into the machine from the left-hand end thereof. 3ª 3ᵇ represent a series of straightening-rolls, the series 3ª being shown as arranged at right angles to the rolls 3ᵇ. This arrangement not only serves to keep the wire in place, but to effect a more efficient straightening and dragging action of the wire.

Referring to Figs. 3 and 4, 20 represents a bracket secured to and extending from the rear of the framework. 21 represents a short shaft carried by said bracket. 22 represents a pulley rigidly mounted on the outer end of said shaft. 23 represents a belt connecting said pulley with a pulley 24, mounted upon a driving-shaft 25, adapted to be driven by any suitable source of power. 26 (see Figs. 5 and 24) represents a pinion rigidly mounted on the inner end of the shaft 21 and meshing with a spur-gear 27, rigidly mounted upon the inner end of a shaft 28, carried by the bracket 20. 29 (see Fig. 4) represents a pinion rigidly mounted upon the outer end of the shaft 28 and meshing with a spur-gear 30, rigidly mounted on the outer end of the shaft 31, carried by the lower part of the framework. 32 represents a spur-gear fast on the shaft 31 adjacent the gear 30 and meshing with a spur-gear 33, fast on shaft 34, carried by the lower part of the framework and extending the length of the machine. From the shafts 31 and 34 various mechanisms of the machine receive their movement and time. The arrangement of the shafts and gears above described is shown in Fig. 24, and the direction of the movement of said shafts and gears is indicated by arrows.

Referring to Figs. 3, 23, and 24, 40 41 represent two complemental cams fast on the right-hand end of the shaft 34. 42 43 represent two complemental cams fast on the shaft 34 inside the framework and near the right-hand end thereof. 44 45 represent two complemental cams fast on the shaft 34 at the left-hand end thereof. 46 represents a crank rigidly mounted on the left-hand end of the shaft 34 and outside of the framework. 47 represents a spur-gear loosely mounted on the shaft 34 adjacent the crank 46. 48 represents a beveled gear secured to the inner side of the spur-gear 47 and rotating therewith. 49 represents a spur-gear fast on the left-hand end of the shaft 31. 50 represents an idle spur-gear mounted upon a stud 51, carried by the framework and meshing with the gears 49 and 47. By this means the combined gears 47 and 48 are turned in the direction opposite that of the rotation of the shaft 34. 52 represents a short shaft mounted in the left-hand end of the machine, running from the rear toward the front of the framework. (See Figs. 3 and 24.) 53 represents a beveled gear fast on the inner end of the shaft 52, meshing with the beveled gear 48. 54 represents a spur-gear on the outer end of the shaft 52 and arranged to mesh with the spur-gear 55, (see Fig. 3,) fast on the end of the shaft 56, carried by a bracket 57 on the left-hand lower end of the framework. (See Fig. 1.)

Referring to Figs. 3, 4, 5, 23, 24, and 24ª, 58 represents a shaft carried by the brackets 59, which are secured to the rear part of the framework in such position that the shaft 58 is over the shaft 31. 60 61 represent two complemental cams fast on the shaft 58 at the right-hand end thereof. 62 63 represent a pair of complemental cams fast on the shaft 58 adjacent the cams 60 61. 64 65 represent two complemental cams fast on the shaft 58 at the left-hand end thereof.

Referring to Figs. 23 and 24, 66 represents a sleeve loosely mounted on the end of the shaft 58, projecting beyond the framework at the left-hand end of the machine. 67 represents a beveled gear secured to and carried by the inner end of said sleeve. 68 represents a disk carried by the outer end of said sleeve and formed with a depression 69, ending in two shoulders 70 70. (See Fig. 3.) 71 represents a hand-wheel rigidly mounted in the end of the shaft 58 adjacent the disk 68. This hand-wheel is provided with two spring-pressed pawls 72, whose operative ends are arranged to engage the shoulders 70 70, (see Fig. 3,) and thus lock the shaft 58 to the sleeve 66. 73 represents a vertical shaft carried by the framework of the machine and arranged between the shafts 58 and 31. 74 represents a beveled gear carried by the upper end of the shaft 73 (see Fig. 23) and meshing with the gear 67. 75 represents a beveled gear carried by the lower end of the shaft 73 and meshing with the beveled gear 76, fast upon the outer end of the shaft 31. By this arrangement the shaft 58 is turned by the shaft 31. If for any reason it is desired to turn the shaft 58 without disturbing the shaft 31, the spring-pawls 72 are released from the disk 68, and then the shaft 58 can be turned by the hand-wheel as desired.

Referring to Figs. 1 and 3, 80 81 represent two crank-arms rigidly fixed upon the opposite ends of the shaft 56 and arranged at an angle of one hundred and eighty degrees to each other. In each of the arms 80 81 is a screw 82, running lengthwise of said crank-arms, each constituting, in effect, the radius of a circle whereof the shaft 56 is the center. 83 represents a block carried by the screw 82 of the crank-arm 80. 84 represents a similar block carried by the screw of the crank-arm 81. By adjusting the screws these blocks may be adjusted toward or away from the shaft to increase or diminish the throw of the pitman, hereinafter described. 85 represents the pitman, one end of which is connected to the block 83 of the crank-arm 80. The upper end of this pitman is pivoted to the lower end of a rack 86, arranged to run in suitable guideways 87. 88 represents a pitman one end of which is connected to the block 84, while the upper end of said pitman is pivoted to the rack 89, arranged to slide in complemental ways 90. 91 represents a short shaft carried by brackets 92, projecting from the left-hand end of the framework above the brackets 57. From an inspection of Fig. 1 it will be seen that the brackets 92 not only serve to carry the shaft 91, but also to support the guideways 87 and 90. 93 represents a pinion loose on the outer end of shaft 91 and arranged to mesh with the rack 86. 94 represents a ratchet-arm loosely mounted upon the shaft 91, connected to be operated by the pinion 93. 96 represents a complemental pinion loosely mounted on the inner end of the shaft 91, arranged to mesh with the rack 89. 97 represents a ratchet-arm loosely mounted on the shaft 91 and connected to be operated by the pinion 96. 98 represents a wheel loosely mounted on the shaft 91 and carrying upon its outer side a ratchet-wheel 99 for engagement with the ratchet-arm 94 and on its inner face a ratchet-wheel 100 for engagement with the ratchet-arm 97. Between the wheel 98 and the ratchet-wheel 99 is formed a grooved feed-roll 101, arranged to engage the complemental grooved feed-roll 102, that is suitably supported below the feed-roll 101. The described arrangement of the gears and ratchets shows an intermittent motion of the wheel 98 in the direction of the arrow, a stay-wire 3 being gripped between the grooved feed-rolls 101 and 102. The throw of the racks 86 and 96 may be increased or diminished, depending upon the distance desired to insert the stay-wire into the machine, by means of the adjustable blocks 83 84.

Figs. 18 and 19 show another form of mechanism for effecting the intermittent feed of the stay-wire. On the shaft 52 is rigidly mounted a gear 170$^a$. (Shown in dotted lines.) Adjacent this gear or formed integral therewith is a wheel 171$^a$, formed with a peripheral cam 172$^a$. 173$^a$ represents an adjustable plate adjustably secured on the side of the wheel 171$^a$ and adapted to increase the length of the cam 172$^a$, if so desired. 174$^a$ represents a bracket extending out on the left-hand end of the machine, formed with a vertical arm 175$^a$, carrying a shaft 176$^a$. 178$^a$ represents a spur-gear rigidly mounted on the shaft 176$^a$. 179$^a$ represents a slot formed in the bracket 174$^a$, adapted to carry an adjustable shaft 180$^a$. 181$^a$ represents a gear-wheel mounted on the shaft 180$^a$ and arranged to engage with the gears 178$^a$ and 170$^a$. By this means motion is imparted to the gear 178$^a$. The speed of the gear 178$^a$ may be increased or diminished by changing the size of the gear 181$^a$, the slot serving as a means for adjusting the shaft 180$^a$ in or out to compensate for differences in the size of the gears. 182$^a$ represents a grooved feeding-wheel rigidly mounted upon the shaft 176$^a$. 183$^a$ represents a bracket extending out from the framework of the machine over the wheel 182$^a$ and carrying at its end a pintle 184$^a$. 185$^a$ represents a lever pivoted midway its ends on the pintle 184$^a$. 186 represents a lever pivoted to the inner end of the lever 185$^a$, formed with a series of staggered cam-faces 187, arranged to engage a spring 188. 189 represents a pintle carried by the lever 185$^a$. 190 represents a small grooved feed-wheel mounted upon the pintle 189 directly over the feed-wheel 182ª. 191 represents a tube through which the stay-wire 3 is fed to the feed-wheels 182ª and 190. 192 represents a tube through which the stay-wire 3 passes into the machine after it leaves the feed-wheels. In the operation of the machine the feed-wheel 190 is pressed down against the stay-wire 3 by the spring 188 engaging one of the faces 187 that is farthest from the pintle 194, upon which the lever 186 is mounted. When for any reason it is desired to lift the wheel 190 from engagement with the wire 3, the cam-lever 186 is swung down to bring the shorter cam-faces 187 in engagement with the spring. 195 represents an arm pivoted upon the shaft 176ª and formed with a cam-finger 196, arranged to be engaged by the cam 172ª. 197 represents an extension of the arm 195 beyond the shaft 176ª. 198 represents a rod connected at one end to the extension 197 and at its other end to the outer end of the lever 185ª. In the operation the wheel 171ª is revolved in the direction of the arrow, the revolution of the wheel 171ª being continuous. When the cam 172ª engages the finger 196, the lever 195 is rocked, thus raising the lever 185ª, lifting the wheel 190 from engagement with the wire, as shown in Fig. 19. This stops the feeding action until the cam 172ª passes by the finger 196, when the feeding action will be resumed, the wire during the feeding action being gripped between the spring-pressed wheel 190 and the wheel 182ª.

Referring to Fig. 3, 110 represents an adjustable block carried by a radial screw 111 upon the crank-arm 46. 112 represents a shaft carried by the upper part of the frame of the machine. 113 represents a ratchet-wheel mounted upon said shaft at the left-hand end thereof. (See Fig. 3.) 114 represents a spring-pressed detent-pawl arranged to engage teeth on the ratchet-wheel 113 to prevent reverse motion. 115 represents a double-arm crank loosely mounted on the end of the shaft 112. One arm of said crank is provided with a ratchet-pawl 117. The other arm of said crank is provided with a ratchet-pawl 118. The ratchet-pawl 117 is used when it is desired to feed the fabric a distance corresponding to one tooth at each stroke of the pitman 119. The pawls 117 and 118 are so arranged that when both are in use and one is in engagement with a ratchet-tooth the other will be half-way between two teeth, thus permitting a feed of the fabric roll corresponding to the distance of one-half of one tooth, which will effect a feed above the fabric roll one-half in amount to that produced when the pawl 117 is used alone. This arrangement gives a wide range to the feed. 119 represents a pitman, one end of which is connected to the block 110 and the other end to the double-arm crank 115. 120 represents a turnbuckle formed as a part of the pitman 119, which furnishes an additional means of adjustment.

Referring to Figs. 1 and 4, 122 represents a girth at the upper front side of the machine, supported by bracket-arms 123. In each end of the girth 122 is loosely arranged a screw-threaded rod 124. Upon each rod 124 and bearing on the top of the girth 122 is arranged a screw-threaded hand-wheel 125, by means of which the rods are raised or lowered. 126 represents a girth at each end of which is pivotally connected one of the rods 124. (See Fig. 1.) This girth at either end is formed with fingers 127, taking into dovetailed grooves 128 in the uprights, in order to steady the girth and maintain it against lateral displacement. By means of the rods 124 the girth can be raised or lowered to any desired height. 130 represents a rod carried in suitable bearings on the girth 126. To this rod are rigidly secured at predetermined points short levers 131, (see Fig. 27,) the number and arrangement of said levers depending upon the number and arrangement of the cutters and coilers it is desired to use for the stay-wires. 132 represents a combined cutter and coiler supported upon the girth 126 in front of one of the levers 131 in the middle of the machine. 133 represents a coiler supported on the girth 126 in front of a lever 131 at the left-hand end of the machine. 134 represents a coiler supported on the girth 126 in front of a lever 131 at the right-hand end of the machine. 135 represents a lever rigidly secured to the right-hand end of the rod 130. (See Fig. 4.) 136 represents a lever mounted upon a stud 137 at the lower right-hand end of the machine. This lever is provided with two arms 138 139. The arm 138 carries a roller 140, engaging the cam 41, while the arm 136 carries a roller 141, engaging the cam 40. By this means a rocking motion is given to the lever 136. 142 represents an arm projecting from said lever toward the front of the machine. 143 represents a pitman connected at its lower end to the end of the arm 142. The upper end of this pitman is provided with a series of holes 144, in one of which a pin 145, carried by the arm 135, is arranged, depending upon the height to which the girth 126 is adjusted. By the described arrangement a rocking motion is given to the shaft 130 for the operation of the cutters and coilers hereinafter described, while by means of the rods 124 and the holes 144 in the pitman 143 the girth 126, with its cutters and coilers, may be adjusted up or down in order to bring its cutters and coilers at the proper point to operate upon a particular strand of wire of a particular mesh.

150 represents a series of wheels fast on the shaft 112, there being one of the wheels for each strand-wire. Each of the wheels 150 is formed with a series of grooved teeth 151, the grooves being for the reception of the strand-wire, while the teeth engage the stay-wire, and thus effect the feed of the fabric and draw the strand-wires into the machine.

152 represents a roll carried by brackets 153 at the rear of the machine. The fabric after it leaves the wheels 150 passes under this roll 152 to the take-up roll 153ª. The take-up roll 153ª is formed with trunnions 154 at each end, arranged in suitable brackets 20 at the rear of the machine.

155 represents a wheel fast upon the trunnion 154 at the right-hand end of the machine.

156 represents a belt running from the wheel 155 to a wheel 157, loosely mounted on the shaft 112. 158 represents a ratchet-wheel rigidly fixed upon said shaft adjacent the wheel 157.

159 represents a pawl mounted upon the wheel 157 and in engagement with the ratchet. The arrangement is such that the wheel 157 is driven by the ratchet and pawl 158 159 in the direction of the arrow. If it is desired to tighten the fabric, the wheel 157 may be turned independently of the ratchet-wheel 158, and a reverse motion may be given the feed-wheel by throwing up the pawl 159.

160 represents a lever pivoted at one end over the trunnion 154. This lever carries a pulley 161, arranged upon the belt 156. The opposite end of this lever is connected in any suitable way to a ratchet device 162, whereby the tension or strain of the pulley 161 on the belt 156 may be increased or diminished in order to secure the desired pull of the belt on the pulley or wheel 155.

Referring to Fig. 1, 170 represents a cutter carried by a stationary girth 171 in the front of the machine. The stay-wire is fed through this cutter into the machine and then severed. 172 represents a lever by which the knife of the cutter is operated. 173 represents a bell-crank pivoted at one end to a lug 174, carried by the upright 1. 175 represents a roll carried by the angle of the bell-crank and arranged to be engaged by the periphery of the wheel 176, fast upon the shaft 56. This wheel is formed with two cams 177, arranged at one hundred and eighty degrees apart. As these cams engage the roll 175 the bell-crank 173 is rocked on its pivot 174. 178 represents a lever pivoted at 179 to the framework of the machine. One arm of this lever is pivoted to one arm of the bell-crank 173. The other arm of this lever is pivoted to a pitman 180. The opposite end of this pitman is provided with a series of holes 181' to receive the pintle of the lever 172, the holes permitting the regulation of the throw of the cutter-lever 172.

Referring to Figs. 6, 7, and 12, 171 represents a stationary girth on the front side of the machine, extending the entire length thereof. 181 represents a dovetailed boss formed on the inner side of the girth 171 and extending the length of the girth. 182 represents a series of arms, each clamped on the boss 181 by means of an undercut lip 183 engaging one face of the boss and clamp 184, forced against the opposite undercut edge of the boss by means of the screw 185 passing through said clamp and into the arm, as shown in Fig. 6. By this arrangement any desired number of arms may be mounted upon the boss 181, and these arms may be adjusted back and forth to suit the style of fabric to be made and the number of strand-wires to be used. Each of the arms 182 is provided on its free end with a lug 186, formed with a cup-shaped recess 187, terminating in an aperture 188 for the reception of the stay-wires. The cup-shaped recess 187 faces in the direction of the feed of the stay-wires and serves to guide the end of the stay-wire into the aperture 188. 189 represents a segmental block that forms one wall of the aperture 188. This segmental block is carried by a lever 190, pivoted in ears 191, carried by the lug 186. A spring 192, arranged between the lug and an extension 193 of the lever, serves to yieldingly keep the block 189 in the position shown in Fig. 11 to close the side of the aperture 188 or to yield when the stay-wire 3 is pulled sidewise out of said aperture, as hereinafter described. (See Fig. 12.) The lugs carried by the arms 182 constitute stay-wire receivers and holders, the wire being received into these parts from the feed and held until transferred to the welding-jaws.

Referring to Figs. 1, 4, 21, and 22, 200 represents a bell-crank lever pivoted at its elbow to a bracket 201, there being one of these levers at each end of the machine and adapted to be operated by the cams 62 63 and 64 65, respectively, (see Fig. 24ª,) as will be hereinafter described. The horizontal arm of each lever terminates in a bearing 202, Fig. 1, in which are loosely arranged the ends of a rod 203, the rod being raised and lowered as the bell-cranks are rocked on their pivots.

Referring to Figs. 3, 4, 21, 22, and 23, 204 represents a lever pivoted at its lower end at 205 to the framework, there being one of these levers at each end of the machine, directly under the cams 62 63 64 65, respectively. (See Figs. 3, 4, and 24ª.) Each lever 204 at its upper end is formed with arms 206 206, each carrying a roller 208. The rolls 208 of the lever 204 at the right-hand end of the machine engage the cams 62 63, while the rolls 208 of the lever 204 at the left-hand end of the machine engage the cams 64 65. 209 represents a pitman. One end of this pitman is screw-threaded into the socket-piece 210, pivoted to the lever 204. The opposite end of this pitman carries a pin 211, that is arranged in a slot 212, formed in the end of a vertical arm of the bell-crank 200. By this means the pitman can be adjusted to adjust the throw of the bell-crank 200. As the levers 204 move in and out, due to the action of their respective cams, they impart a rocking motion to the bell-crank 200, and thus raise and lower the rod 203.

Referring to Fig. 1, 213 represents an arm fast on the shaft 203 near the bearing 202 at the right-hand end. (See Figs. 1, 21, and 22.)

Referring to Figs. 20, 21, 22, 23, 214 represents a forked bell-crank lever pivoted at its angle to the framework of the machine at the right-hand side thereof immediately beneath the cams 60 61, Figs. 4 and 24$^a$. Each arm of the bell-crank 214 carries a roller 215, adapted for engagement with the cams 60 61. 216 represents a pitman connecting the end of the lever 213 with the bell-crank 214. By this mechanism as the bell-crank is moved in and out by its cams 60 61 it imparts an oscillating motion to the bell-crank 214, thus rocking the shaft 203 in its bearings as the latter rises and falls with the shaft 203.

Referring to Figs. 6, 7, 9, and 10, 217 represents a series of arms, each arranged upon the shaft 203, and to prevent it from turning thereon by means of keys 218 these arms are formed with a split collar, as shown, and that in turn is clamped upon the shaft 203 by means of bolts 219. By this means the arms 217 may be adjusted back and forth on the shaft 203 to suit the style of fabric being employed and the arrangement of the strand and stay wires. In practice these arms 207 are arranged in a vertical plane adjacent the arms 182, so that they may pass down close beside the latter. 220 represents a plate carried at the end of each arm 217, formed with a notched extremity 221, adapted to engage the wire. 222 represents a finger pivoted on the lower side of the plate 220, normally extending over and by the notched extremity 221. 223 represents a spring arranged to engage the finger 222 and maintain it yieldingly across the notch 221, as shown in Fig. 10. By the two movements given the shaft 203—to wit, the rocking motion, due to the bell-crank 214, and the movement of translation, due to the bell-crank 200—a path of motion is given to the notch 221 that is indicated by arrow-lines in Figs. 5, 9, 10, 11, and 12, the strand-wire being removed from the receivers in this notch and transferred to the welding-jaws. The initial step in the operation of these transfer-fingers is shown in Fig. 9. The plate 220 passes up above the stay-wire 3 while in the receivers 187, and in such passage the stay-wire 3 is engaged by the fingers 221. Then as the notch 221 descends upon the wire 3 the latter is yieldingly held in place by the finger 222. (See Fig. 10.) Further motion of the finger forces the stay-wire out of the receiver by throwing back the segment 189, (see Fig. 12,) carrying the stay-wire down against the strand-wires, as shown in Figs. 6, 9, 10, and 11.

Referring to Figs. 5, 13, and 17, 230 represents a girth situated back of the plane occupied by the strand-wires and running lengthwise of the machine. This girth at its top surface is formed with an undercut groove 231. 232 represents a like girth situated in the rear of the girth 230 and in like manner formed on its top side with an undercut groove 233. 234 represents a series of heavy copper bars, one of which is arranged upon the girth 232, but insulated therefrom. 236 represents a bolt arranged in the rear end of each bar 234, but insulated therefrom, the head 235 of the bolt being arranged in the undercut groove 233. A nut 237, insulated from the bar 234, engages the bolt 236, and thus secures the rear end of each bar 234 in place. By this arrangement the rear end of each bar 234 may be positioned at any desired point upon the rail, Fig. 17. Each bar 234 is formed with an offset, as shown, and in the offset is arranged a short copper bar 238, the two bars being insulated from each other and held together by suitably-insulated bolts 239. 240 represents a bolt passing down through the bars 234 and 238, but insulated therefrom. The head 241 of this bolt is arranged in the undercut recess 231. 242 represents a nut upon the bolt 240 and insulated from the bars. It will be noted that in each case the bar 234 rests upon the rail 232. In Fig. 14 it will be noted that the outer end of the bar 238 rests upon the girth 230 and that this bar is beneath the bar 234, while in Fig. 15 it is the outer end of the bar 234 that rests upon the girth 230, and the bar 238 is over the bar 234. By the above arrangement the two bars are held together as one and may be adjusted toward or from either end of the machine and locked in place, the adjustment permitting the positioning of the bars, according to the particular fabric to be welded. Further, by the reversal of the bars in Figs. 14 and 15 and also Figs. 16 and 17 I am enabled to arrange two pairs of bars in close order.

250, Fig. 32, represents a coil of the secondary circuit composed of a copper bar of relatively large cross-section. This coil is composed of two turns designed to receive between them the coil 251 of the primary circuit 252. The coil 250 terminates in two terminals 253 254. One of these terminals 254 is adapted to be secured to a bar 234 by a bolt 255, while the other terminal 253 is adapted to be secured to a complemental bar 238 by a bolt 256. The terminals 253 254 not being insulated from their respective bars, the bars and terminals, together with the coil, form a part of the secondary or welding circuit. The secondary coil and its terminals are the same for each welding-jaw; but the arrangement of the copper bars connected to the terminals is somewhat different, whereby I am enabled to arrange the transformers in compact order. It will be noticed in Fig. 17 that the secondary coil is supported upon the bars 234 238, while in Fig. 16 the secondary coil depends from said bars. This arrangement enables me to arrange two coils side by side.

Referring to Figs. 14 and 15, it will be noticed that the arrangement of the bars and secondary coils is similar, but that the pair of coils is close to the rail 232 instead of the girth 230. This enables me to stagger the arrangement of each pair of coils.

260 represents a stationary welding-jaw comprising a copper bar secured to the end of the bar 234 in Fig. 14 and 238 in Fig. 15 by bolts 261, or, in other words, to the end of the top bar of each pair of bars. (See Figs. 6 and 32.)

262 represents a steel contact-plate, the lower edge of which rests upon an inclined lip 263 of the jaw 260.

264 represents a clamp arranged to engage the inclined face of the contact-plate and a projection on the jaw 260.

265 represents a screw passing through the clamp 264 into the jaw, and thus binding the contact-plate 262 to the front face of the stationary welding-jaw.

266 represents a copper block secured by screws 267 to the outer end of the copper bar 238 in Fig. 14 and 234 in Fig. 15—in other words, to the lower bar of each pair of bars.

268 represents a series of copper plates secured by screws 269 to the end of each block 266. (See Fig. 6.)

270 represents a rail at the front of the machine beneath the rail 171 and extending the entire length of the machine. This rail is formed with a slot 271.

280 represents a series of hollow cylinders arranged in the slot 271. The outer end of each cylinder 272 is held in place against the rail by clamps 273, secured to the end of the cylinder and resting against beveled edges 281 of the rail. The inner end 274 of each piston is held in place by clamps 275, engaging beveled edges 282 of the rail. By this arrangement the cylinders can be adjusted toward or from either end of the machine at any desired point, according to the character of the fabric to be made and the arrangement and number of the strand and stay wires and the points at which it is desired to weld. The rail 270 is movable in suitable bearings 283 at either end of the machine. (See Figs. 3 and 4.)

Referring to Fig. 4, 284 represents a lever pivoted at the right-hand end of the machine over the shaft 34.

Referring to Fig. 3, 285 represents a lever pivoted at the left-hand end of the machine over the shaft 34. Below each lever 284 and 285 is a bell-crank 287, (see Fig. 20,) pivoted at its angle to the framework. One arm of the bell-crank is provided with a roller 288 and the other arm with a roller 289. The rolls of one bell-crank 287 are arranged to engage the cams 42 43, (see Fig. 24,) while the rolls of the other bell-crank are arranged to engage the cams 44 and 45. 290 represents a pitman connecting each arm of the bell-crank 287 to the lower end of the lever 285. Each lever 285 is connected by a pitman 291 to one end of the sliding girth 270. By this arrangement the girth is given a reciprocating motion toward and from the stationary welding-jaws. In each cylinder 280 is arranged a rod 292, (see Fig. 6,) the extremities 274 and 272 of the cylinder furnishing bearings for the rod. Each rod is formed with a collar 293. 294 represents a coiled spring arranged on the rod 292 between the collar 293 and a collar 295 on the rod near the bearing 272, the spring tending to throw the rod inward or to the left, Fig. 6. 296 represents a nut arranged upon the end of each rod 292, resting normally against the girth 270. By means of this nut the tension of the spring can be adjusted as desired to regulate the amount of movement of the rod 292. It will of course be understood that there is a rod 292 opposed to each pair of bars 234 238. The inner end 298 of each rod is squared and fits a complemental recess in the bearing 274, thus preventing the rod from turning. 297 represents a standard mounted on the top of the inner end of each rod and insulated therefrom. This standard carries an adjusting-screw 299 for the purpose hereinafter explained. 300 represents a copper block secured by screws or bolts 301 to the lower side of the inner end of each rod 292, the block and the screws being suitably insulated from the rod. 302 represents a series of copper plates connected by bolts 303 at their lower ends to the lower end of the copper plates 268 and connected by bolts 304 at their upper ends to the blocks 300. The copper plates 302 and 268 constitute a yielding connection between the copper blocks 266 and the blocks 300, the latter constituting part of a movable welding-jaw. 304ª represents a steel contact-plate arranged upon the front face of each copper block 300 opposite the contact-plates 262, both plates being suitably grooved to hold their respective wires. The contact-plate 304ª rests upon an undercut lip 305 of the block 300. 306 represents a clamp engaging a beveled face on the top side of the contact-plate 304ª on one side and a shoulder on the block 300 at the other end. 307 represents a bolt by which the clamp-plate is locked upon the block 300 and against the contact-plate 304ª. As the rail 270 is drawn forward, as hereinbefore described, it forces the movable welding-jaws, with their contact-plate 304ª, against the cross or stay wires 3. The movable welding-jaw presses the stay-wire 3 against the strand-wire 2, the latter being pressed against the contact-plate 262 of the stationary welding-jaw. The springs 294 are relatively powerful, so that as the jaws close on the wire the springs are put under tension. As the wire softens under the action of the welding-current the springs cause the forward movement of the welding-jaw to effect the desired amount of upset.

Referring to Fig. 6, it will be seen that both the transfer-arms 217, the receivers with their arms 182, the stationary welding-jaws, and the movable welding-jaws are all adjustable, as well as other various parts of the machine, so that the machine may be adjusted for the manufacture of any desired fabric. Over each stationary welding-jaw is arranged a stationary bracket 310, carrying the contact-plate 311, suitably insulated from the bracket and connected to the primary circuit. To each bracket 310 is pivoted a depending arm 312, carrying a yielding contact 313 and suitably insulated from the arm 312 and adapted to be pressed against the contact 311. The contact 313 is also connected to the primary circuit. 314 is a spring arranged between the bracket and its complemental arm and adapted to force the latter away. 315, Fig. 6, represents a bell-crank pivoted at its angle to the bracket 310. The horizontal arm of this bell-crank is adapted to engage a latch 316 on the lower end of the arm 312. The vertical arm of the bell-crank 315 is formed with an enlargement 317, arranged in the path of the end of the adjusting-screw 299. 318 represents a spring carried by each bracket 310 and adapted to keep the horizontal arm of the bell-crank in engagement with the latch 316. 320 represents a sliding girth arranged at the rear of the depending arm 312 and connected to the girth 291, to be slid simultaneously with the girth 270. As the girths go forward to throw back the movable jaws to the position shown in Fig. 6 the girth 320 engages the arms 312, thereby closing the contacts 313 and 311 and causing the horizontal arm of the bell-crank to engage the latch 316 and lock the arm 312. As the movable welding-jaw is brought forward to the position shown in Fig. 7, or the welding position, the girth 320 is carried away from the arms 312. The adjusting-screw 299 is set to strike the part 317 as the movable jaw moves forward on the softening of the metal at such a time as is desired to interrupt the welding-current by breaking the primary circuit, the point of the screw engaging the bell-crank and releasing the latter and permitting the spring 314 to throw apart the contacts. By this means the welding-circuit of the current is automatically stopped when a predetermined amount of upset has been used.

Instead of the plates of copper 268 and 302 being secured together by the bolts 300, I may use copper plates 302ª, formed in the shape of a loop, Fig. 8.

Referring to Fig. 32, 252 represents a primary circuit. 251 represents the primary coil adapted to be arranged between the two turns of a secondary coil 250. 325 is a hand-switch which controls the passing of the current from any suitable source of power to the primary circuit. 326 represents a device for closing the primary circuits. There is one of these primary circuit-closers for each primary circuit or group of primary circuits. They are arranged to be operated automatically by the machine. The particular arrangement for effecting this opening and closing of the primary circuits at this point may be variously modified, and I make no claim to any special arrangement in this application. 311 and 313 represent the circuit-breakers in the primary circuit, controlled by the adjusting-screw 299, carried by each movable welding-jaw.

Referring to Fig. 34, I have shown diagrammatically four of the primary circuits, the circuit-closers 326 and their circuit-breakers 311 and 313. The circuit-closers shown are composed of two pins 326ª 326ᵇ, one of which is movable. In practice the pin 326ᵇ may be thrown against the pin 326ª by the revolution of the shaft, or vice versa, to effect the closing of the primary circuit. As the welding-jaws are opened all of the circuit-closers 311 313 are closed as the jaws advance, and immediately after they have gripped the parts to be welded the circuit is closed at 326 and is timed to remain closed until after the circuit has been broken at 311 313 by the adjusting-screw 299. In the diagram as illustrated in Fig. 34 the welding has been completed and the circuit at the right broken at 311 313. Further operation of the machine will effect the breaking of the circuit at 326 and the closing of the next primary circuit by contact of the two pins 326ª 326ᵇ, and so on.

Referring to Figs. 5, 25, 26, 27, 28, 29, 30, and 31, the rail 126 is formed on its under side with a flanged groove 330. 331 represents cutting and coiling carriages, here shown as three, supported against the under side of the rail 126 by means of bolts 332, the heads 333 of which are arranged in the flanged groove 330. By loosening the nuts 334 these carriages can be slid along the rail and set at any desired point with reference to any particular strand of wire in order to sever or coil the stay-wire at any particular point. 335 represents a slide arranged to move in suitable ways 336. This slide is formed with a slot 337, in which is arranged the end of a lever 131, whereby the slide is moved in and out at an angle to the plane of the fabric by means of the rocking of the rod 130, as hereinbefore described. 338 339 represent a pair of coiling-fingers pivoted to the slide 335. Each of these coiling-fingers is formed with a rearwardly-projecting lug 340. Between these lugs is arranged a spring 341, normally tending to throw said lugs apart and the ends of the fingers together. Each of the fingers is further provided with side lugs 342, adapted to engage stationary cams 343, connected to the carriages as the slide is moved toward the rear of the machine, (see Fig. 5,) in order to force the ends of the coiling-fingers outward, as hereinafter described. 345 represents a stationary cutting member connected to the carriage by bolts 346, whereby said member may be adjusted in and out. 347 represents a sliding cutting member arranged in the carriage. 348 represents a lever pivoted to the carriage, one arm of the lever being arranged in a suitable recess in the sliding cutting member 347. This lever is formed with a rearwardly-projecting lug 349, adapted to be engaged by a cam 350, carried by the lever 131. 351 represents a spring one end of which engages the lug 349, the other an abutment 352 on the carriage, the spring tending to keep the lug 349 in engagement with the cam 350. As the stay-wires 3 come up against the stationary knife 345 they are severed by the knife 347, due to the movement of the lever 131. The movement of the lever 131 operates the slide 335, causing the ends of the coiling-fingers 339 to engage the cut ends of the stay-wire 3 immediately after they have been severed and bend them to the position shown in Fig. 29. The continued movement of the slide carries the cut ends of the stay-wire 3 to the position shown in Fig. 30. This is the limit of the movement of the slide in that direction. The lever 131 then moves the slide in the opposite direction. 356 represents hammers carried by the inner end of each slide and adapted to engage the cut ends of the stay-wires as the slide is retracted and press them back against anvils 357, that are secured to the carriage. The hammers are so arranged as to press the cut ends of the stay-wire back upon the stay-wire about the strand-wire. While but one of these combined cutters and coilers is shown in operation in Fig. 1, any number may be used, depending upon the number of divisions into which it is desired to separate the fabric after it is welded.

It will be seen that the various elements of the machine are all adjustable and the operation in each case automatic.

Having thus explained the nature of my invention and described a way of constructing and using the same, though without attempting to set forth all the forms in which it may be made or all the modes of its use, what I claim, and desire to secure by Letters Patent, is—

1. In combination with the coöperative elements of a wire-fabric machine, a series of laterally-adjustable welding-jaws, a series of stationary laterally-adjustable receivers, a series of laterally-adjustable transfer devices, means for feeding the strand-wire, means for feeding the stay-wire, whereby a fabric may be produced with any desired number or arrangement of welds.

2. In combination with the coöperative elements of a wire-fabric machine, means for welding wires, means for feeding strand-wires, means for feeding stay-wires, laterally-adjustable cutting and coiling mechanism whereby the fabric may be divided and the cut ends of the stay-wire coiled at any desired point.

3. A device for straightening strand-wires comprising a bracket adjustable laterally on the machine, an adjustable slide carried by said bracket, and complemental rolls upon the slide and bracket for engaging the strand-wire.

4. In combination with the coöperative elements of a wire-fabric machine, a carriage, a slide mounted on said carriage, coiling-fingers arranged to be operated by said slide, and a knife arranged to be operated by said slide, whereby a stay-wire may be automatically cut and its cut ends coiled.

5. In combination with the coöperative elements of a wire-fabric machine, an adjustable girth, an adjustable cutter carried by said girth whereby the stay-wire may be cut at any desired point in the fabric.

6. In combination with the coöperative elements of a wire-fabric machine, an adjustable girth, and an adjustable coiler carried by said girth whereby the stay-wire may be coiled at any desired point in the fabric.

7. In combination with the coöperative elements of a wire-fabric machine, an adjustable rail, an adjustable carriage mounted on said rail, and combined cutting and coiling mechanism on said carriage whereby the stay-wire may be cut and its ends coiled at any desired point in the fabric.

8. In combination with the coöperative elements of a wire-fabric machine, strand-feeding mechanism comprising two complemental feed-wheels, means for causing said wheels to grip the stay-wire, means for rotating one of said wheels, and automatic means for separating said wheels at predetermined times to release their grip from the wire to stop the feeding action.

9. In combination with the coöperative elements of a wire-fabric machine, means for feeding strand members, a series of laterally-adjustable transformer-bars, a series of transformers carried by said bars, and welding-jaws suitably connected to said bars.

10. In combination with the coöperative elements of a wire-fabric machine, a movable plunger-rail, compound cams, and connections between said cams and the rail.

11. In combination with the coöperative elements of a wire-fabric machine, a crank, an adjusting-screw carried by said crank, a nut arranged on said screw, a pitman connected to said nut, and connections between said pitman and operating mechanism of the machine.

12. In combination with the coöperative elements of a wire-fabric machine, a slotted rail, a series of cylinders arranged in said slot, and means for maintaining said cylinders in any desired position, comprising clamps secured to one of said parts adapted to engage the beveled face of the other of said parts.

13. In a machine of the class specified, means for feeding strand members, means for welding strand and stay members to form a fabric, and automatically-acting means for subdividing said fabric.

14. In a machine of the class specified, means for feeding strand members, means for welding strand and stay members to form a fabric, automatically-acting means for subdividing said fabric and coiling the ends of the cut or divided stay-wire.

15. In combination with the coöperative elements of a wire-fabric machine, means for feeding strand-wires, means for feeding a stay-wire, means for welding said wires at points of intersection, a combined cutting and coiling means arranged to subdivide the stay-wire and to coil the cut ends, whereby the welded fabric may be subdivided and finished into any number of strips.

16. In combination with the coöperative elements of a wire-fabric machine, means for feeding strand-wires, means for feeding a stay-wire, means for welding said wires at points of intersection, a combined cutting and coiling means adjustable in the direction of the strand-wires and arranged to subdivide the stay-wire after the welding operation and to coil the cut ends, whereby the welded fabric may be subdivided and finished into strips.

17. In combination with the coöperative elements of a wire-fabric machine, means for feeding strand-wires, means for feeding a stay-wire, means for welding said wires at points of intersection, comprising a series of pairs of copper bars, the members of each pair being connected together but insulated from each other, a transformer connected to each pair of copper bars, a welding-jaw connected to one end of each of the said bars, and means for adjusting said bars to position the welding-jaws.

18. In combination with the coöperative elements of a wire-fabric machine, means for feeding strand members, means for feeding a stay member, means for welding said members at points of intersection, comprising a pair of laterally-adjustable transformer-bars, the members of which are connected together but insulated from each other, a transformer having one terminal of its secondary rigidly secured to one member of said pair and its other terminal secured to the other member of said pair, and a welding-jaw connected to each bar.

19. In combination with the coöperative elements of a wire-fabric machine, means for feeding strand members, means for feeding a stay member, means for welding said members at points of intersection, comprising two laterally-adjustable copper bars, each connected to a terminal of the secondary circuit of the transformer, a movable welding-jaw and a flexible copper connection between the said jaw and free end of one of said bars, and a complemental welding-jaw suitably connected to the other bar whereby the opening and closing movement of said jaw will be secured without the use of sliding contacts.

20. In combination with the coöperative elements of a wire-fabric machine, means for feeding the strand members, means for feeding a stay member, means for welding said members at points of intersection comprising a series of pairs of welding-jaws, a transformer for each pair of welding-jaws, and an adjustable copper bar connecting each welding-jaw to a terminal of the secondary circuit of its complemental transformer.

21. In combination with the coöperative elements of a wire-fabric machine, means for feeding strand members, means for feeding a stay member, means for welding said members at points of intersection, and means for straightening the strand-wires, comprising a clamp adapted to be adjustably secured upon the framework of the machine carrying two series of staggered rolls, and means for adjusting one series of rolls toward and from the other.

22. In combination with the coöperative elements of a wire-fabric machine, means for feeding strand members, means for feeding a stay member, means for welding said members at points of intersection, said stay-feeding means comprising pressure-wheels arranged to grip and feed the stay-wire, means for driving said wheels and automatic means for intermittently releasing the grip of said wheels on the wire.

23. In combination with the coöperative elements of a fabric-machine, means for feeding strand members, means for feeding a stay member, means for welding said members at points of intersection, said stay-feeding means comprising a pair of pressure-wheels arranged to grip and feed the wire, means for driving said wheels continuously in the same direction, a continuously-driven wheel carrying a trip device, and connections between said tripping device and the pressure-wheels whereby their grip upon the wire may be intermittently released.

24. In combination with the coöperative elements of a wire-fabric machine, means for feeding strand members, means for feeding a stay member, means for welding said members at points of intersection, means for subdividing the stay-wires, comprising a pair of sliding knives, and means for coiling the cut ends of the wire.

25. In combination with the coöperative elements of a wire-fabric machine, means for feeding strand-wires, means for feeding a stay-wire, means for welding said wires at points of intersection, means for subdividing the stay-wire, and means for coiling the cut end of the stay-wire, comprising a pair of stationary anvils, a pair of reciprocating fingers for partially coiling the wire, and a pair of reciprocating anvils to complete the coiling or bending.

26. In combination with the coöperative elements of a wire-fabric machine, means for feeding strand-wires, means for feeding a stay-wire, means for welding said wires at points of intersection to form a fabric, and automatically-acting means for subdividing said fabric.

27. In combination with the coöperative elements of a wire-fabric machine, means for feeding strand-wires, means for feeding a stay-wire, means for welding said wires at points of intersection, means to form a fabric, and automatically-acting means for subdividing said fabric and coiling the ends of the cut or subdivided wire.

In testimony whereof I have affixed my signature in presence of two witnesses.

JOHN C. PERRY.

Witnesses:
  H. L. ROBBINS,
  R. BULLOCK.